(12) United States Patent
Wang et al.

(10) Patent No.: US 11,328,038 B2
(45) Date of Patent: May 10, 2022

(54) COMPUTATIONAL UNITS FOR BATCH NORMALIZATION

(71) Applicant: SambaNova Systems, Inc., Palo Alto, CA (US)

(72) Inventors: Mingran Wang, San Jose, CA (US); Xiaoyan Li, San Jose, CA (US); Yongning Sheng, San Jose, CA (US)

(73) Assignee: SambaNova Systems, Inc., Palo Alto, CA (US)

(*) Notice: Subject to any disclaimer, the term of this patent is extended or adjusted under 35 U.S.C. 154(b) by 87 days.

(21) Appl. No.: 16/695,138

(22) Filed: Nov. 25, 2019

(65) Prior Publication Data
US 2021/0157550 A1   May 27, 2021

(51) Int. Cl.
*G06F 17/18* (2006.01)
*G06F 5/01* (2006.01)
(Continued)

(52) U.S. Cl.
CPC .......... *G06F 17/18* (2013.01); *G06F 5/01* (2013.01); *G06F 7/49936* (2013.01); *G06F 9/3885* (2013.01)

(58) Field of Classification Search
CPC .......... G06F 17/18; G06F 7/49936; G06F 5/01–012; G06F 2205/003; G06F 2207/382; H03M 7/24
See application file for complete search history.

(56) References Cited

U.S. PATENT DOCUMENTS

| 5,365,465 A | 11/1994 | Larson |
| 5,506,797 A | 4/1996 | Koshiba |

(Continued)

FOREIGN PATENT DOCUMENTS

| CN | 109871235 A | 6/2019 |
| CN | 110471643 A | 11/2019 |

(Continued)

OTHER PUBLICATIONS

Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.

(Continued)

*Primary Examiner* — Matthew D Sandifer
(74) *Attorney, Agent, or Firm* — Haynes Beffel & Wolfeld LLP; Sikander Khan; Bruce Young

(57) ABSTRACT

Herein are disclosed computation units for batch normalization. A computation unit may include a first circuit to traverse a batch of input elements $x_i$ having a first format, to produce a mean $\mu_1$ in the first format and a mean $\mu_2$ in a second format, the second format having more bits than the first format. The computation unit may further include a second circuit operatively coupled to the first circuit to traverse the batch of input elements $x_i$ to produce a standard deviation $\sigma$ for the batch using the mean $\mu_1$ in the first format. The computation unit may also include a third circuit operatively coupled to the second circuit to traverse the batch of input elements $x_i$ to produce a normalized set of values $y_i$ using the mean $\mu_2$ in the second format and the standard deviation $\sigma$.

23 Claims, 13 Drawing Sheets

(51) Int. Cl.
  *G06F 7/499* (2006.01)
  *G06F 9/38* (2018.01)

(56) References Cited

U.S. PATENT DOCUMENTS

| | | | |
|---|---|---|---|
| 6,256,653 | B1 | 7/2001 | Juffa et al. |
| 7,015,921 | B1 | 3/2006 | Trivedi et al. |
| 7,472,149 | B2 | 12/2008 | Endo |
| 8,184,317 | B2 | 5/2012 | Okamoto |
| 9,411,756 | B2 | 8/2016 | Nogueira et al. |
| 10,698,853 | B1 | 6/2020 | Grohoski et al. |
| 11,106,430 | B1 | 8/2021 | Kadkol et al. |
| 2003/0068097 | A1* | 4/2003 | Wilson .................... G06T 5/007 382/276 |
| 2005/0160129 | A1 | 7/2005 | Endo |
| 2012/0030203 | A1 | 2/2012 | Chiang et al. |
| 2013/0151576 | A1 | 6/2013 | Lutz et al. |
| 2013/0262539 | A1* | 10/2013 | Wegener ................. G06F 7/483 708/204 |
| 2013/0339564 | A1 | 12/2013 | Nogueira et al. |
| 2014/0040334 | A1 | 2/2014 | Burgess et al. |
| 2014/0222883 | A1 | 8/2014 | Pineiro et al. |
| 2017/0054449 | A1 | 2/2017 | Mani et al. |
| 2017/0244982 | A1 | 8/2017 | Fuldseth et al. |
| 2017/0322774 | A1 | 11/2017 | Zhang |
| 2017/0322805 | A1 | 11/2017 | Zohar et al. |
| 2018/0157465 | A1 | 6/2018 | Billner et al. |
| 2018/0174022 | A1 | 6/2018 | Young |
| 2018/0220144 | A1 | 8/2018 | Su et al. |
| 2018/0329681 | A1 | 11/2018 | Zhang et al. |
| 2019/0042244 | A1 | 2/2019 | Henry et al. |
| 2019/0042924 | A1 | 2/2019 | Pasca et al. |
| 2019/0114139 | A1 | 4/2019 | Zhang |
| 2019/0147323 | A1 | 5/2019 | Li et al. |
| 2019/0205734 | A1 | 7/2019 | Guntoro |
| 2019/0341052 | A1 | 11/2019 | Allibhai |
| 2020/0159544 | A1 | 5/2020 | Shah et al. |
| 2020/0159692 | A1 | 5/2020 | Shah et al. |
| 2020/0272882 | A1* | 8/2020 | Lo ........................ G06N 3/0445 |
| 2020/0371805 | A1 | 11/2020 | Lutz |
| 2021/0034982 | A1 | 2/2021 | Sather et al. |
| 2021/0064341 | A1 | 3/2021 | Kuo et al. |
| 2021/0064372 | A1* | 3/2021 | Sun ..................... G06F 9/30014 |
| 2021/0072955 | A1* | 3/2021 | Mellempudi ....... G06F 7/49942 |
| 2021/0096816 | A1 | 4/2021 | Wang et al. |
| 2021/0216873 | A1 | 7/2021 | Liu |

FOREIGN PATENT DOCUMENTS

| | | |
|---|---|---|
| TW | I318337 B | 12/2009 |
| TW | I557641 B | 11/2016 |
| TW | 201935329 A | 9/2019 |
| WO | 2008036944 A1 | 3/2008 |
| WO | 2010142987 A1 | 12/2010 |
| WO | 2018100920 A1 | 6/2018 |
| WO | 2021046274 A1 | 3/2021 |
| WO | 2021067318 A1 | 4/2021 |
| WO | 2021108328 A1 | 6/2021 |
| WO | 2021126530 A1 | 6/2021 |

OTHER PUBLICATIONS

Bendersky "The Softmax function and its derivative," https://eli.thegreenplace.net/2016/the-softmax-function-and-its-derivative, Oct. 18, 2016, 11 pages.
Eppler et al. ,"High speed neural network chip for trigger purposes in high energy physics," IEEE, Proc. of the conference on design, automation and test in Europe, Feb. 1998, 8 pages.
Gomar et al. "Precise digital implementations of hyperbolic tanh and sigmoid function," 2016 50th Asilomar Conference on Signals, Systems and Computers, Nov. 6-9, 2016, 4 pages.
Intel BLOAT16—Hardware Numerics Definition White Paper, Rev. 1.0, Nov. 2018, 7 pages.
Ioffe, et al., "Batch Normalization: Accelerating Deep Network Training by Reducing Internal Covariate Shift," Cornell University, available at https://arxiv.org/abs/1502.03167, Mar. 2, 2015, 11 pages.
Koeplinger et al., "Spatial: A Language and Compiler for Application Accelerators," PLDI '18, Jun. 18-22, 2018, Association for Computng Machinery, 16 pages.
Lin et al., "A Digital Circuit Design of Hyperbolic Tangent Sigmoid Function for Neural Networks," 2018 IEEE Int'l Symp. on Circuits and Systems, May 18-21, 2018, 4 pages.
Petersen, "Softmax with cross-entropy," https://mattpetersen.github.io/softmax-with-cross-entropy, Jun. 25, 2017, 19 pages.
Prabhakar, et al., "Plasticine: A Reconfigurable Architecture For Parallel Patterns", pp. 389-402, IEEE, Jun. 24, 2017.
Turkson et al. "Artificial neural network applications in the calibration of spark-ignition engines: An overview," Engineering Science and Technology, an International Journal, vol. 19, Issue 3, Sep. 2016, 1346-1359.
U.S. Appl. No. 16/260,548 "Matrix Normal/Transpose Read and a Reconfigurable Data Processor Including Same," filed Jan. 29, 2019, 43 pages.
U.S. Appl. No. 16/407,675 "Control Flow Barrier and Reconfigurable Data Processor ," filed May 9, 2019, 32 pages.
U.S. Appl. No. 16/504,627 "Quiesce Reconfigurable Data Processor," filed Jul. 8, 2019, 78 pages.
U.S. Appl. No. 16/536,192 "Compiler Flow Logic for Reconfigurable Architectures ," filed Aug. 8, 2019, 57 pages.
U.S. Appl. No. 16/572,516 "Efficient Execution of Operation Unit Graphs on Reconfigurable Architectures Based on User Specification ," filed Sep. 16, 2019, 63 pages.
U.S. Appl. No. 16/560,057 "Sigmoid Function in Hardware and a Reconfigurable Data Processor Including Same" filed Sep. 4, 2019, 35 pages.
U.S. Appl. No. 16/572,527 "Performance Estimation-Based Resource Allocation for Reconfigurable Architectures" filed Sep. 16, 2019, 68 pages.
U.S. Appl. No. 16/590,058 "Computation Units for Functions Based On Lookup Tables" filed Oct. 1, 2019, 37 pages.
U.S. Appl. No. 16/688,069 "Look-Up Table with Input Offsetting" filed Nov. 19, 2019, 36 pages.
U.S. Appl. No. 16/718,094 "Computational Units for Element Approximation" filed Dec. 17, 2019, 87 pages.
Wikipedia "Floor and ceiling functions," downloaded Aug. 12, 2019, 5 pages.
U.S. Office Action in U.S. Appl. No. 16/688,069 dated Jan. 29, 2021, 18 pages.
Iqbal, "Reconfigurable Processor Artchitecture for High Speed Applications," IEEE Int'l Advance Computing Conference, Patiala, India, Mar. 6-7, 2009, 6 pages.
PCT/US2020/49285—International Search Report and Written Opinion dated Nov. 18, 2020, 13 pages.
PCT/US2020/061862—International Search Report and Written Opinion dated Mar. 10, 2021, 11 pages.
U.S. Appl. No. 16/590,058—Office Action dated Jun. 1, 2021, 9 pages.
U.S. Office Action in U.S. Appl. No. 16/688,069 dated Jun. 3, 2021, 9 pages.
Anonymous: "Rounding to 0.5", Arduino Forum, Aug. 28, 2017, 4 pages.
PCT/US2020/062905—International Search Report and Written Opinion dated Mar. 22, 2021, 14 pages.
MISB ST 1201.4, "Floating Point to Integer Mapping," Feb. 28, 2019, pp. 1-21.
Pasupuleti-etal, Low Complex High Accuracy Computation Approximations to Enable On device RNN Applications, May 26, 2019, 5 pages.
PCT/US2020/053344—International Search Report and Written Opinion dated Dec. 21, 2020, 11 pages.
PCT/US2020/061060—International Search Report and Written Opinion dated Mar. 4, 2021, 14 pages.
U.S. Appl. No. 16/590,058—Response to Non-Final Office Action dated Jun. 1, 2021 as filed on Aug. 18, 2021, 20 pages.
U.S. Appl. No. 16/688,069—Response to Non-Final Office Action dated Jan. 29, 2021, as filed Mar. 31, 2021, 20 pages.

(56) References Cited

OTHER PUBLICATIONS

TW 109129892—First Office Action dated Aug. 12, 2021, 19 pages.
TW 109134270—First Office Action dated Sep. 30, 2021, 6 pages.
U.S. Appl. No. 16/688,069—Notice of Allowance dated Sep. 22, 2021, 26 pages.
Podobas et al., A Survey on Coarse-Grained Reconfigurable Architectures From a Performance Perspective, IEEEAccess, vol. 2020. 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
U.S. Appl. No. 16/590,058 Notice of Allowance, dated Nov. 3, 2021, 15 pages.
U.S. Appl. No. 16/688,069—Response to Non-Final Office Action dated Jun. 3, 2021, as filed Sep. 3, 2021, 9 pages.
U.S. Appl. No. 16/718,094 Notice of Allowance, dated Jun. 14, 2021, 15 pages.
TW 109129892 Notice of Allowance, dated Nov. 1, 2021, 3 pages.
Anonymous, Activation Function, Wikipedia, Retrieved on Dec. 3, 2021, 5 pages. Retrieved from [ URL: https://en.wikipedia.org/wiki/Activation_function ].
Cook, Comparing bfloat16 range and precision to other 16-bit numbers, dated Nov. 15, 2018, 8 pages. Retrieved on Dec. 3, 2021. Retrieved from the internet [URL: www.johndcook.com/blog/2018/11/15/bfloat16 ].
Wikipedia, bfloat16 floating-point format, 5 pages, retreived on Dec. 3, 2021. Retrieved from the internet [URL: https://en.wikipedia.org/wiki/Bfloat16_floating-point_format ].
TW 109140964 First Office Action, dated Jan. 12, 2022, 11 pages.
TW 109139904 First Office Action, dated Nov. 22, 2021, 19 pages.
TW 109140965 First Office Action, dated Dec. 21, 2021, 8 pages.

\* cited by examiner

COMPUTATIONAL UNITS FOR BATCH NORMALIZATION

CROSS-REFERENCE TO OTHER APPLICATION

This application is related to U.S. Nonprovisional patent application Ser. No. 16/718,094 entitled "COMPUTATIONAL UNITS FOR ELEMENT APPROXIMATION," filed contemporaneously. The related application is incorporated by reference for all purposes.

FIELD OF THE TECHNOLOGY DISCLOSED

The present invention relates to a technology for implementing a circuit to compute normalized elements of a batch.

INCORPORATIONS

The following are incorporated by reference for all purposes as if fully set forth herein:

Koeplinger et al., "Spatial: A Language And Compiler For Application Accelerators," Proceedings Of The 39th ACM SIGPLAN Conference On Programming Language Design And Implementation (PLDI), Proceedings of the 43rd International Symposium on Computer Architecture, 2018;

Prabhakar et al., "Plasticine: A Reconfigurable Architecture for Parallel Patterns," ISCA '17, Jun. 24-28, 2017, Toronto, ON, Canada;

U.S. Nonprovisional patent application Ser. No. 16/239,252, filed Jan. 3, 2019, entitled, "VIRTUALIZATION OF A RECONFIGURABLE DATA PROCESSOR";

U.S. Nonprovisional patent application Ser. No. 16/197,826, filed Nov. 21, 2018, entitled, "CONFIGURATION LOAD OF A RECONFIGURABLE DATA PROCESSOR";

U.S. Nonprovisional patent application Ser. No. 16/198,086, filed Nov. 21, 2018, entitled, "CONFIGURATION UNLOAD OF A RECONFIGURABLE DATA PROCESSOR";

U.S. Nonprovisional patent application Ser. No. 16/260,548, filed Jan. 29, 2019, entitled, "MATRIX NORMAL/TRANSPOSE READ AND A RECONFIGURABLE DATA PROCESSOR INCLUDING SAME";

U.S. Nonprovisional patent application Ser. No. 16/536,192, filed Aug. 8, 2019, entitled, "COMPILER FLOW LOGIC FOR RECONFIGURABLE ARCHITECTURES";

U.S. Nonprovisional patent application Ser. No. 16/407,675, filed May 9, 2019, entitled, "CONTROL FLOW BARRIER AND RECONFIGURABLE DATA PROCESSOR"; and U.S. Nonprovisional patent application Ser. No. 16/504,627, filed Jul. 8, 2019, entitled, "QUIESCE RECONFIGURABLE DATA PROCESSOR".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Normalization is a process of adjusting the range of a set of elements, while preserving the relative magnitude of each element relative to other elements of the set. for example, normalization produces a distance-preserving, bijective map between elements of sets. For example, a set of numbers may be mapped to the unit interval (i.e., [0,1]), where the relative distance between any two normalized numbers is preserved. Normalization is useful in a variety of machine learning applications, such as gradient descent algorithms and multivariate optimization. Normalizing a set of numbers is a multi-step computationally-intensive process. In machine learning applications, batch normalization may be performed on matrices with large numbers of elements leading to increased computational loads, large power consumption, and extended computation times.

Current methods to improve computational throughput in batch normalization focuses on reducing the computational power expended on a per-element basis. For example, low-precision representations of matrix elements may be utilized in the batch normalization process, thereby reducing the per-element usage of memory during computation.

However, one drawback of utilizing low-precision representations of elements is that accumulated rounding errors in the multi-step normalization process may lead to large error rates. For example, large error rates may compromise the distance-preserving properties of batch normalized numbers leading to a variety of pathologies. For example, performing gradient descent on a pathological set of normalized matrix elements may lead to non-convergence, convergence to false minima, and/or the absence of true minima.

Accordingly, ways to reduce error rates in batch normalization, while preserving computational efficiency may be desirable.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
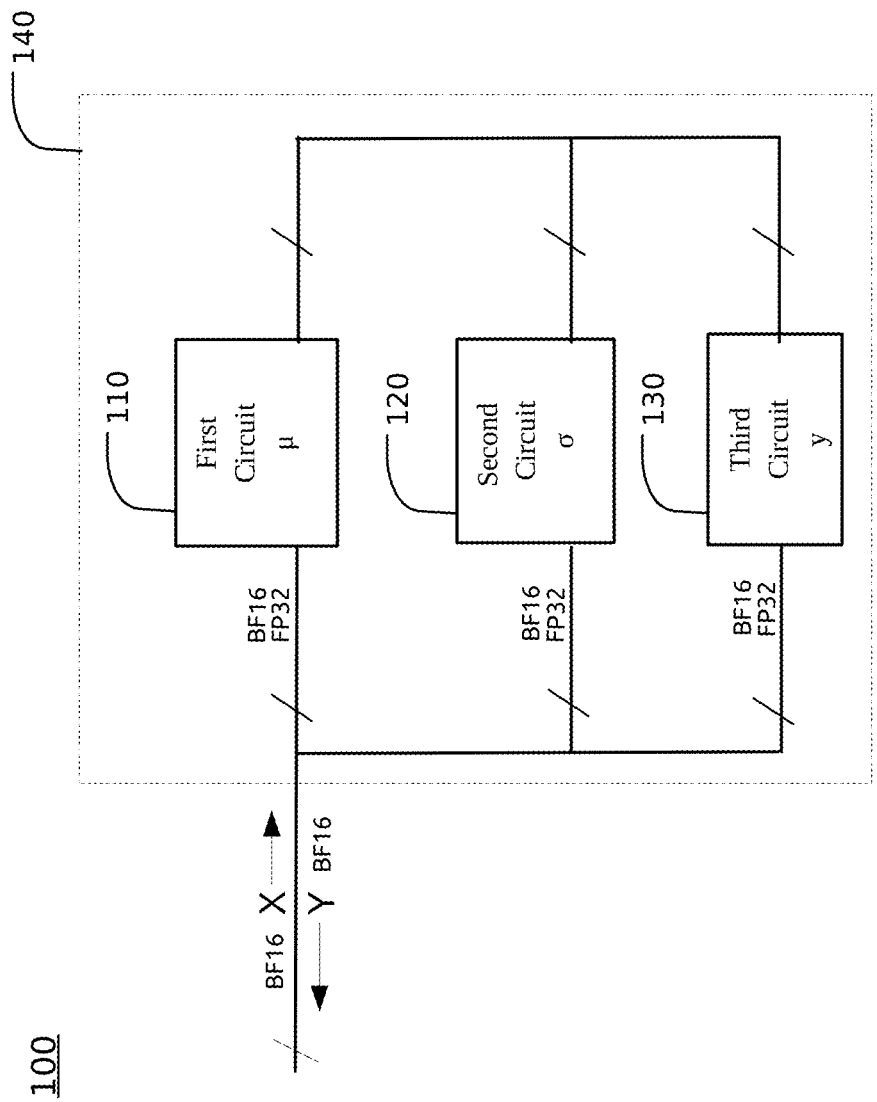
FIG. 1 is a schematic diagram illustrating a circuit for computing a batch normalization, according to various embodiments.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

In various embodiments, a composite circuit 100 may include a first circuit 110, a second circuit 120, and a third circuit 130 for producing normalized output elements for a batch of input elements. In operation, a first circuit 110 may receive one or more input elements in a first format. The first format may correspond to a reduced-memory and/or low-precision representation of a batch of input elements. The first circuit 110 may process the input elements to produce a batch mean, $\mu$, in a second format. For example, the first circuit 110 may compute a product of each batch element, $x_i$, and the inverse of the number of elements in the batch, m, the product being $x_i \times (1/m)$. In various embodiments, the first circuit 110 may represent the product as a second-format number. The first circuit 110 may further accumulate the second-format products to obtain $\mu = \Sigma_{i=1}^{m} x_i \times (1/m)$. Because the second format mean is computed by using second-format products, accumulated rounding errors may be reduced, thereby preserving accuracy. In further embodiments, the first circuit 110 may modify the second-format mean to produce a first-format representation of the mean. For example, the first circuit 110 may truncate a second-format batch mean to generate the first-format batch mean.

Furthermore, a second circuit 120 may utilize the first-format batch mean to compute a variance of the batch in the first format. For example, the second circuit 120 may compute the difference between each element $x_i$ and the first format batch mean, $\mu_1$, the difference being $x_i - \mu_1$. The second circuit 120 may further compute the square of the difference $(x_i - \mu_1)^2$ and add a constant term, $\epsilon$, to generate $(x_i - \mu_1)^2 + \epsilon$. The second circuit 120 may further multiply $(x_i - \mu_1)^2 + \epsilon$ by $(1/m)$ and accumulate the sum over all $x_i$, the result being the variance: $\sigma^2 + \epsilon \Sigma_{i=1}^{m} [(x_i - \mu_1)^2 + \epsilon] \times (1/m)$. The second circuit 120 may further compute the inverse square root of the variance to obtain the inverse standard deviation: $1/\sqrt{(\sigma^2 + \epsilon)}$, where $\epsilon$ is a constant term. Because a variance is an average across all $x_i$ in the batch, accumulated rounded errors are, on average, canceled out in the variance computation. Accordingly, utilizing the first-format batch mean to compute the variance preserves computational throughput during the computationally-intensive multiplication steps, without losing computational accuracy.

Furthermore, the third circuit 130 may compute normalized values for each element of the input batch. For example, the third circuit 130 may compute the product of a second-format scale factor, $\gamma$, and the inverse standard deviation, the product being: $\gamma \times 1/\sqrt{(\sigma^2 + \epsilon)}$. The third circuit 130 may further convert a first-format element, $x_i$, into two second-format elements, $x_0$ and $x_1$. For example, the third circuit 130 may multiply each first-format element with a first-format representation of the identity (i.e., 1) to represent the product of the two first-format as a second-format number. The third circuit 130 may further compute the difference between the second-format elements and the second-format mean, $\mu_2$, the differences being: $x_0 - \mu_2$ and $x_1 - \mu_2$. Furthermore, the third circuit 130 may compute the product of the differences and $\gamma \times 1/\sqrt{(\sigma^2 + \epsilon)}$, while also summing by a second-format shift factor, $\beta$, the results being: $y_0 = [(x_0 - \mu_2) \times \gamma \times 1/\sqrt{(\sigma^2 + \epsilon)}] + \beta$, and $y_1 = [(x_1 - \mu_2) \times \gamma \times 1/\sqrt{(\sigma^2 + \epsilon)}] + \beta$, where $y_0$ and $y_1$ are the scaled and shifted batch normalized values. The third circuit 130 may further perform stochastic rounding of the normalized elements, $y_0$ and $y_1$, to produce first-format representations of the normalized batch elements. The third circuit 130 may further package the normalized elements in a data structure (e.g., as a data structure Y $(y_0, y_1)$). These first format normalized elements may be used in subsequent computations by various applications (e.g., gradient descent algorithms). The third circuit 130 may further output the data structure for use by various systems in subsequent calculations.

Accordingly, the composition of a first circuit 110 for computing the batch mean, the second circuit 120 for computing the batch variance, and the third circuit 130 for computing normalized values for batch elements may be implemented in normalizing batch elements. For example, the first circuit 110 generates a batch mean in a first format and a second format. The second circuit 120 may compute the batch variance using the batch mean in the first format. Accuracy may be preserved because accumulation errors in computing the variance and standard deviation cancel each other out. Additionally, the third circuit 130 maintains computational accuracy by using the second-format mean to compute the differences in the normalization step. These computed differences are not averaged, thus, using second-format elements provides improvements to computational accuracy relative to using first format numbers. Similarly, a second-format scale factor and a second-format shift factor are used to improve computational accuracy. Finally, stochastic rounding is performed on the normalized output to generate a first-format data format based on the normalized second-format number for use in further computations by various other applications.

In various embodiments, the first format may be a low-precision and/or reduced-memory representation of an input element. For example, the first format may be a 16-bit Bfloat number. In addition, the second format may be a high-precision and/or full-memory representation of an input element. For example, the second format may be a 32-bit floating-point number. In various embodiments, a batch of input values may enter the composite circuit 100 in the first format. However, as the composite circuit 100 computes the normalized elements in mixed-format region 140, the composite circuit 100 may utilize one or more of the first format and the second format.

Figure 2:
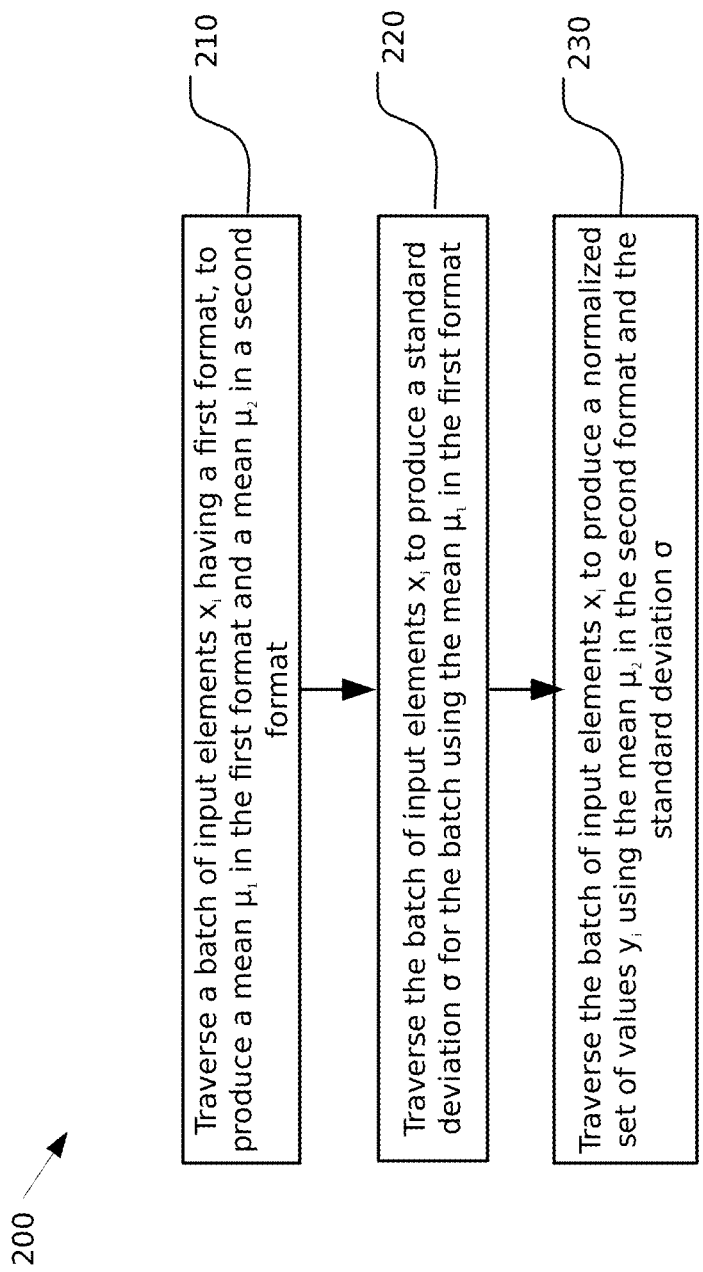
FIG. 2 is a flowchart of method steps for computing normalized elements, according to various embodiments.

FIG. 2 is a flowchart illustrating a method for normalizing an input batch according to various embodiments. According to the flowchart, at Step 210, the first circuit 110 traverses a batch of input elements $x_i$ having a first format, to produce a mean $\mu_1$ in the first format and a mean $\mu_2$ in a second format. In various embodiments, the input batch may include one or more elements that are received by the first circuit 110. In various embodiments, the first circuit 110 100 may compute the product $x_i \times (1/m)$. The first circuit 110 may further sum over the product for each $x_i$ to obtain the batch mean.

At step 220, a second circuit 120 may traverse the batch of input elements $x_i$ to produce a standard deviation $\sigma$ for the batch using the mean $\mu_1$ in the first format. For example, the second circuit 120 may traverse the batch of input elements to compute $[(x_i-\mu_1)^2+\epsilon] \times (1/m)$. The second circuit 120 may further sum over the computed values to obtain the variance: $\sigma^2+\epsilon = \Sigma_{i=1}^{m}[(x_i-\mu_1)^2+\epsilon] \times (1/m)$. The second circuit 120 may compute the inverse square root of the variance to obtain the inverse standard deviation: $1/\sqrt{(\sigma^2+\epsilon)}$, where E is a constant term.

At Step 230, the third circuit 130 may traverse the batch of input elements $x_i$ to produce a normalized set of values $y_i$ using the mean $\mu_2$ in the second format and the standard deviation $\sigma$. For example, the third circuit 130 may convert a first-format element, $x_i$, into two second-format elements, $x_0$ and $x_1$. The third circuit 130 may further compute the difference between the second-format elements and the second-format mean, $\mu_2$, the differences being: $x_0-\mu_2$ and $x_2-\mu_2$. Furthermore, the third circuit 130 may compute the product of the differences and $\gamma \times 1/\sqrt{(\sigma^2+\epsilon)}$, while also summing by a second-format shift factor, $\beta$, the results being: $y_0=[(x_0-\mu_2) \times \gamma \times 1/\sqrt{(\sigma^2+\epsilon)}]+\beta$, and $y_1=[(x_1-\mu_2) \times \gamma \times 1/\sqrt{(\sigma^2+\epsilon)}]+\beta$, where $y_0$ and $y_1$ are the scaled and shifted batch normalized values.

Figure 3:
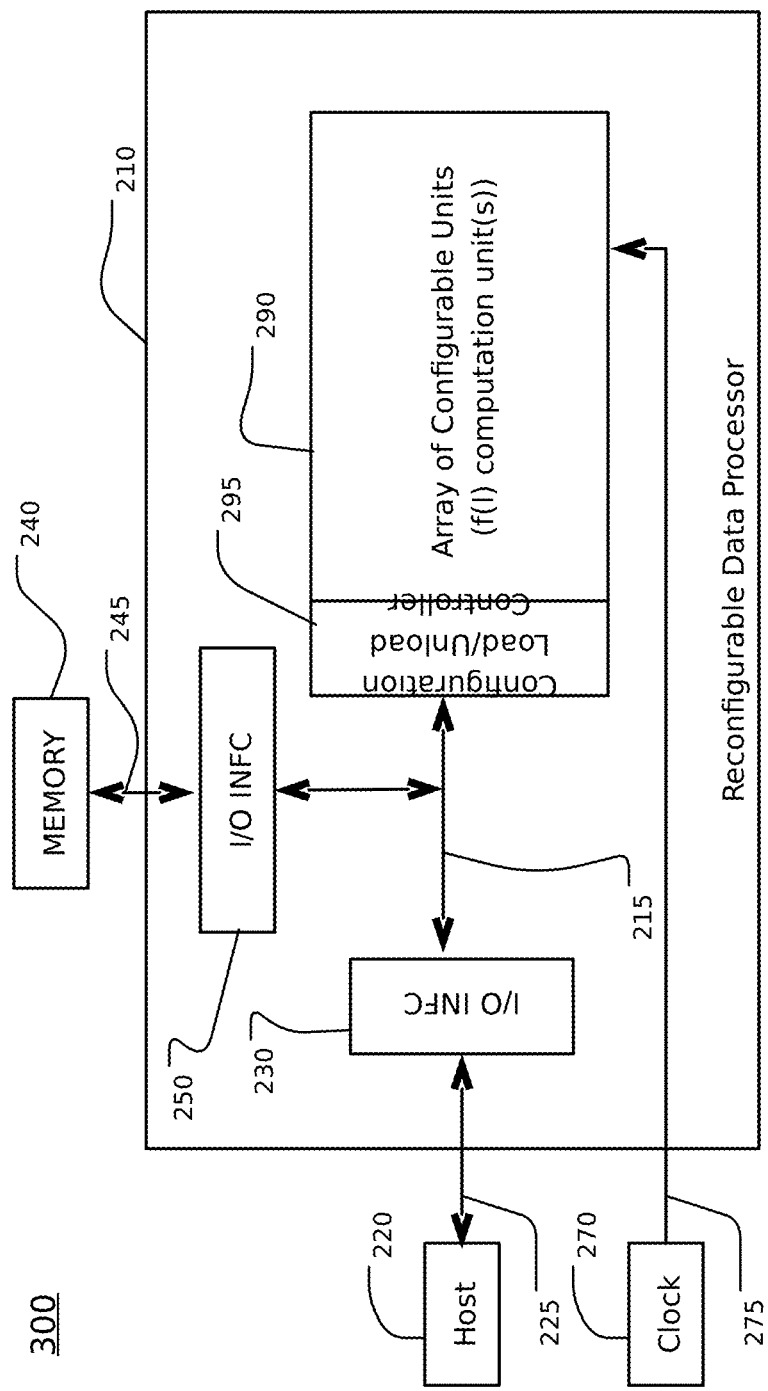
FIG. 3 is a simplified block diagram of a top-level network and components of a CGRA (Coarse Grain Reconfigurable Architecture), according to various embodiments.

FIG. 3 is a diagram illustrating a system 300 including a host 220, a memory 240, and a reconfigurable data processor 210 in which a computation unit as described herein is deployed. As shown in the example of FIG. 3, the reconfigurable data processor 210 includes an array 290 of configurable units and a configuration load/unload controller 295.

Figure 6:
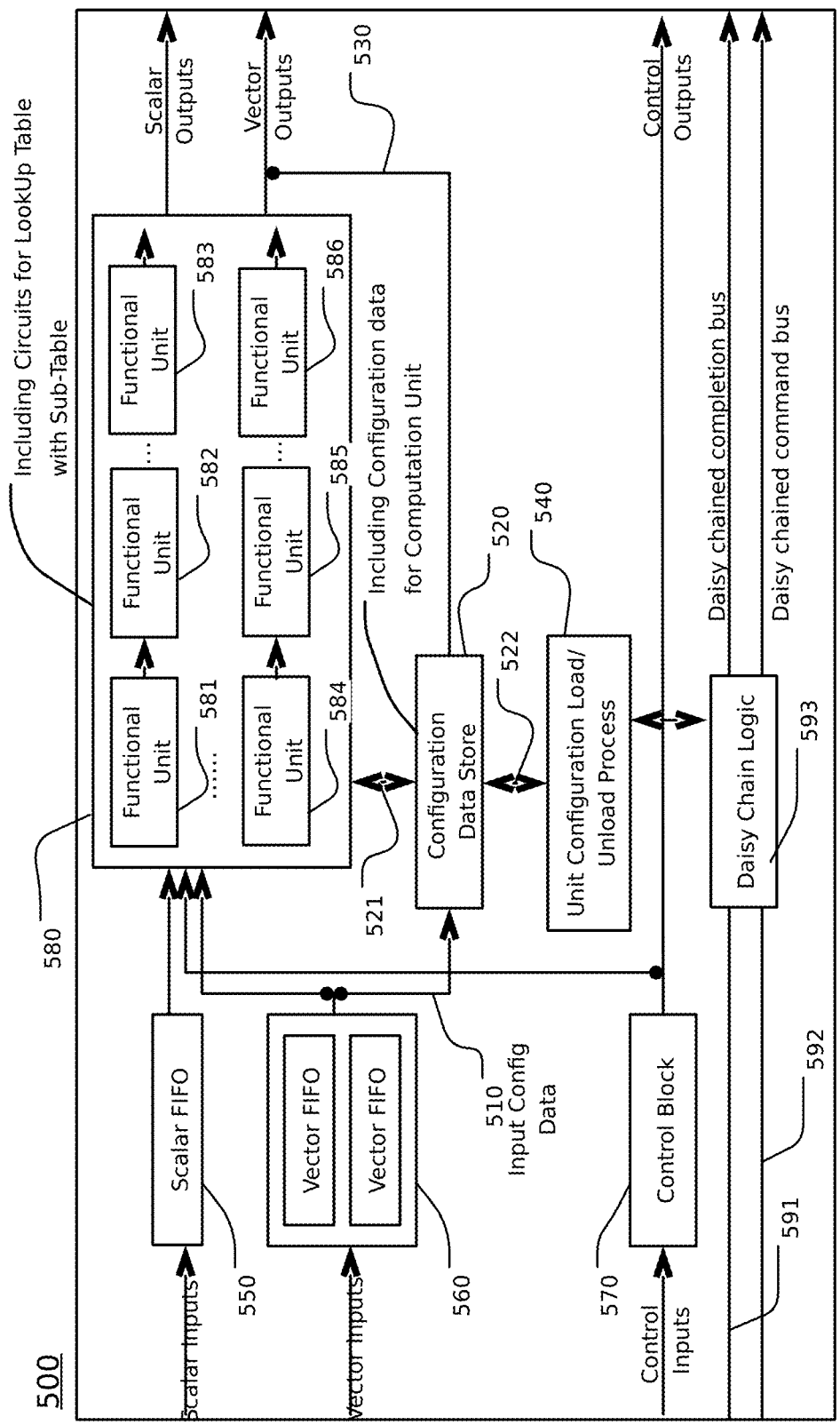
FIG. 6 is a block diagram illustrating an example configurable unit, such as a Pattern Compute Unit (PCU), according to various embodiments.
Figure 7:
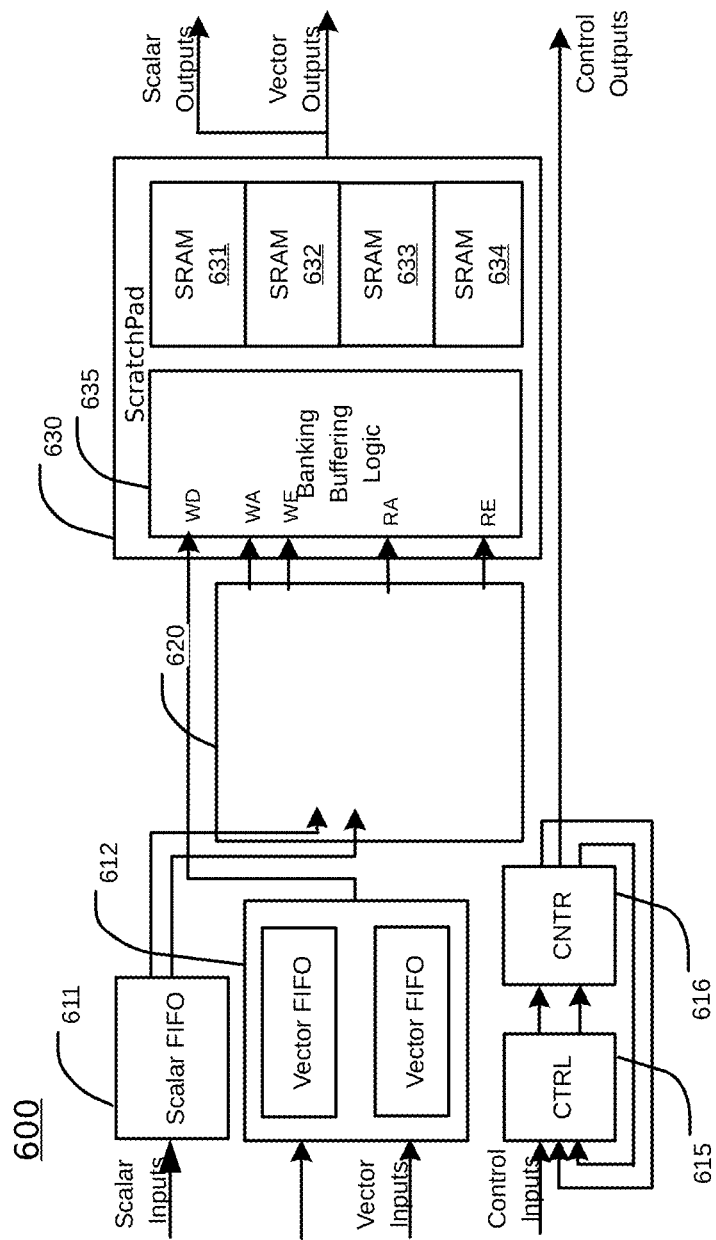
FIG. 7 is a block diagram illustrating an example configurable unit, such as a Pattern Memory Unit (PMU), according to various embodiments.

Configurable units in an array 290 of configurable units are further described in reference to FIGS. 6 and 7. Configurable units can include, or can have units configured to implement, a computation unit or computation units, as described herein.

The processor 210 includes an external I/O interface 230 connected to the host 220 by line 225, and an external I/O interface 250 connected to the memory 240 by line 245. The I/O interfaces 230, 250 connect via a bus system 215 to the array 290 of configurable units and to the configuration load/unload controller 295. The bus system 215 may have a bus width of carrying one chunk of data, which can be for this example 128 bits (references to 128 bits throughout can be considered as an example chunk size more generally).

To configure configurable units in the array 290 of configurable units with a configuration file, the host 220 can send the configuration file to the memory 240 via the interface 230, the bus system 215, and the interface 250 in the reconfigurable data processor 210. The configuration file can be loaded in many ways, as suits a particular architecture, including in data paths outside the configurable processor 210. The configuration file can be retrieved from the memory 240 via the memory interface 250. Chunks of the configuration file can then be sent in a distribution sequence to configurable units in the array 290 of configurable units in the reconfigurable data processor 210.

An external clock generator 270 or other clock line sources can provide a clock line 275 or clock lines to elements in the reconfigurable data processor 210, including the array 290 of configurable units, and the bus system 215, and the external data I/O interfaces. The bus system 215 can communicate data at a processor clock rate via a clock line 275 or clock lines.

Figure 4:
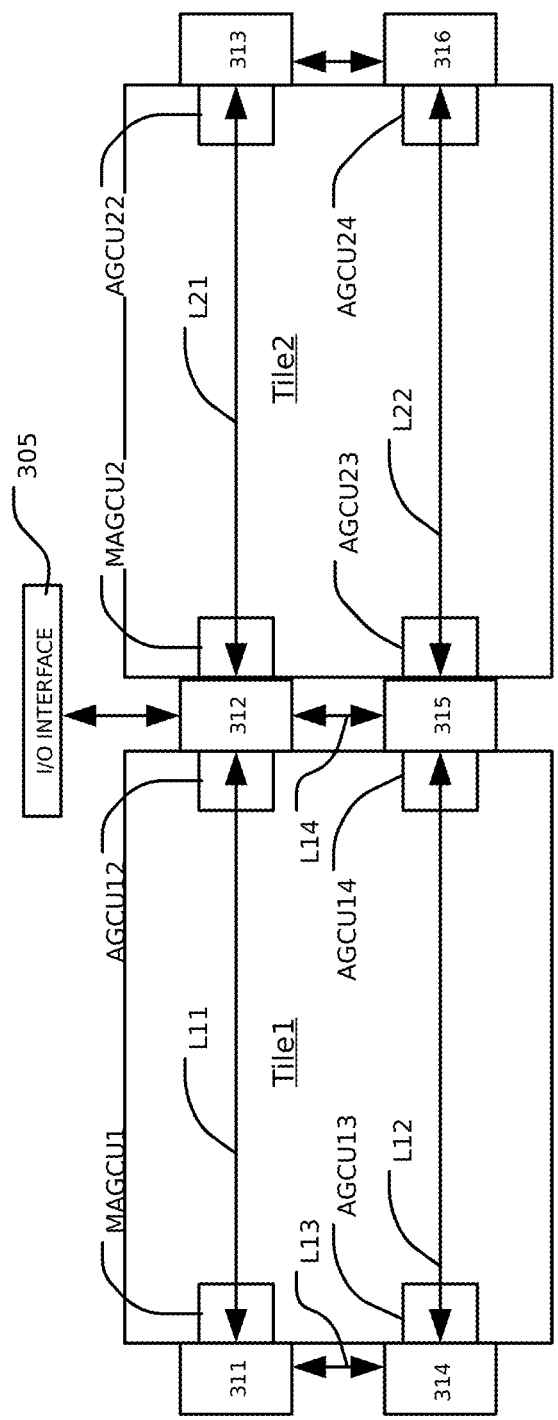
FIG. 4 is a simplified diagram of a tile and an array level network usable in the configuration of FIG. 3, according to various embodiments.

FIG. 4 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including array level networks in this example. An array of configurable units (e.g. 290, FIG. 2) in the tile includes a lookup table with a sub-table. The bus system includes a top-level network connecting the tiles to external I/O interface 305 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g. MAGCU1, AGCU12, AGCU13, AGCU14). The AGCUs are nodes on the top-level network and nodes on the array level networks, and include resources for routing data among nodes on the top-level network and nodes on the array level network in each tile.

Nodes on the top-level network in this example include one or more external I/Os, including interface 305. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (311-316) connecting to each other as well as to other nodes on the top-level network, including the AGCUs, and I/O interface 305. The top-level network includes links (e.g. L11, L12, L21, L22) connecting the top-level switches. Data travel in packets between the top-level switches on the links, and from the switches to the nodes on the network connected to the switches. For example, top-level switches 311 and 312 are connected by a link L11, top-level switches 314 and 315 are connected by a link L12, top-level switches 311 and 314 are connected by a link L13, and top-level switches 312 and 313 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 311, 312, 314 and 315 are connected to MAGCU1, AGCU12, AGCU13 and AGCU14 in the tile Tile1, respectively. Top-level switches 312, 313, 315 and 316 are connected to MAGCU2, AGCU22, AGCU23 and AGCU24 in the tile Tile2, respectively.

Top-level switches can be connected to one or more external I/O interfaces (e.g. interface 305).

Figure 5A:
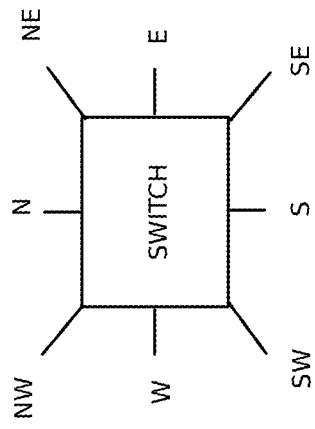
FIG. 5 illustrates an example switch unit connecting elements in an array level network, according to various embodiments.
Figure 5:
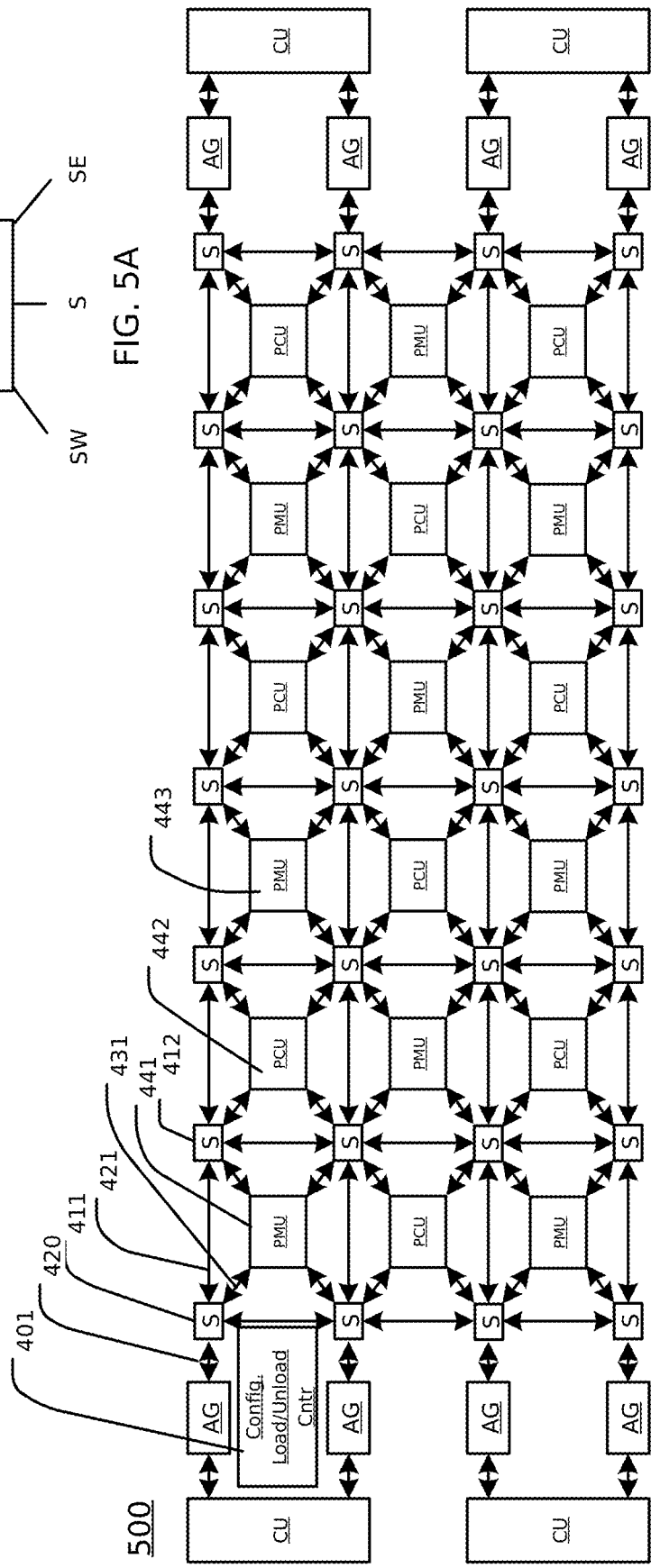

FIG. 5 is a simplified diagram of a tile and an array level network usable in the configuration of FIG. 4, where the configurable units in the array are nodes on the array level network and are configurable to implement a lookup table with a sub-table.

In this example, the array of configurable units 500 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. In this example, the PCUs (e.g. 442) and PMUs (e.g. 443) in the array of configurable units 500 can include resources configurable for implementation of a computation unit, an example configuration of which is described herein (e.g. FIG. 9). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the lookup table with a sub-table. Program Load may also require the load of all PMU memories.

The array level network includes links interconnecting configurable units in the array. The links in the array level network include one or more and, in this case, three kinds of physical buses: a chunk-level vector bus (e.g. 128 bits of data), a word-level scalar bus (e.g. 32 bits of data), and a multiple bit-level control bus. For instance, interconnect 421 between switch units 411 and 412 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 5A illustrates an example switch unit connecting elements in an array level network. As shown in the example of FIG. 5A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 441 can be sent from the configuration load/unload controller 401 to the PMU 441, via a link 420 between the configuration load/unload controller 401 and the West (W) vector interface of the switch unit 411, the switch unit 411, and a link 431 between the Southeast (SE) vector interface of the switch unit 411 and the PMU 441.

In this example, one of the AGCUs is configured to be a master AGCU, which includes a configuration load/unload controller (e.g. 401). The master AGCU implements a register through which the host (220, FIG. 2) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 5). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (250, FIG. 3). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 6 is a block diagram illustrating an example configurable unit 500, such as a Pattern Compute Unit (PCU). A configurable unit can interface with the scalar, vector, and control buses, in this example using three corresponding sets of inputs and outputs (TO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate signals on control lines such as the start or end of execution of a configurable unit. Control inputs are received by control block 570, and control outputs are provided by the control block 570.

Each vector input is buffered in this example using a vector FIFO in a vector FIFO block 560 which can include one or more vector FIFOs. Likewise, in this example, each scalar input is buffered using a scalar FIFO 550. Using input FIFOs decouples timing between data producers and consumers, and simplifies inter-configurable-unit control logic by making it robust to input delay mismatches.

A configurable unit includes multiple reconfigurable data paths in block 580. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 520 is connected to the multiple data paths in block 580 via lines 521.

A configurable data path organized as a multi-stage pipeline can include multiple functional units (e.g. 581, 582, 583; 584, 585, 586) at respective stages. A computation unit or parts of a computation unit can be implemented in multiple functional units at respective stages in a multi-stage pipeline or in multiple multi-stage pipelines, as described in FIG. 9. Input registers in functional units can register inputs from scalar FIFOs 550 or Vector FIFOs 560 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 520 (e.g. serial chains) to store unit files comprising a plurality of chunks (or sub-files of other sizes) of configuration data particular to the corresponding configurable units. Configurable units in the array of configurable units each include unit configuration load logic 540 connected to the configuration data store 520 via line 522, to execute a unit configuration load process. The unit configuration load process includes receiving, via the bus system (e.g. the vector inputs), chunks of a unit file particular to the configurable unit, and loading the received chunks into the configuration data store 520 of the configurable unit. The unit file loaded into the configuration data store 520 can include configuration data, including opcodes and routing configuration, for circuits (e.g. module) implementing a lookup table with a sub-table as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 510 can be provided to a vector FIFO as vector inputs, and then be transferred to the configuration data store 520. Output configuration data 530 can be unloaded from the configuration data store 520 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 5, a daisy-chained completion bus 591 and a daisy-chained command bus 592 are connected to daisy-chain logic 593, which communicates with the unit configuration load logic 540. The daisy-chain logic 593 can include load complete status logic, as described below. The daisy-chained completion bus is further described below. Other topologies for the command and completion buses are clearly possible but not described here.

FIG. 7 is a block diagram illustrating an example configurable unit 600, such as a Pattern Memory Unit (PMU). A PMU can contain scratchpad memory 630 coupled with a reconfigurable scalar data path 620 intended for address calculation (RA, WA) and control (WE, RE) of the scratchpad memory 630, along with the bus interfaces used in the PCU (FIG. 5).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g. 631-634). Banking and buffering logic 635 for the SRAM banks in the scratchpad can be configured to operate in several banking modes to support various access patterns. A computation unit as described herein can include PMUs to store intermediary values written by functional units of the PCUs, the intermediary values stored in the scratchpad memory 630. In a computation unit as described herein, the scalar data path 620 can be used for reading data from PMUs and/or writing data to PMUs utilizing the addressing format of the SRAM scratchpad memory 630, adding appropriate offsets and so on, to read the data entries stored in the scratchpad memory 630. Additionally, or alternatively, the vector data path may be utilized for storing batch elements for input to a PCU. Each PMU can include write address calculation logic and read address calculation logic that provide write address WA, write enable WE, read address RA and read enable RE to the banking buffering logic 635. Based on the state of the local FIFOs 611 and 612 and external control inputs, the control block 615 can be configured to trigger the write address computation, read address computation, or both, by enabling the appropriate counters 616.

A programmable counter chain (Control Inputs, 616, Control Outputs) and control block 615 can trigger PMU execution.

In various embodiments, a computation unit may include an array of configurable units in a reconfigurable data processor, like that represented by FIG. 3-7. Thus, in a reconfigurable data processor, in an array of configurable units connected to a bus system, configurable units in the array include configuration data stores to store configuration data that establishes data flow and execution parameters for a machine. The machine can include a computation unit formed at least in part using the configurable resources in the array. As discussed above, the configurable units in the array can include execution units, configurable using a configuration file to execute a number of functions. In some embodiments, the configuration file can provide an opcode to specify the function to be executed, and constants which can be used as immediate data in the execution of the function. In some embodiments, the opcode and immediate data can be provided from other sources.

In the configuration, a floating-point input I may be supplied to a circuit. The input I has a sign bit, an E bit exponent and an M bit mantissa. For instance, the floating point input I can be in the FP32 floating point format, which includes a sign bit, an 8-bit exponent (E=8) and a 23 bit mantissa (M=23), for a total of 32 bits.

Figure 8:
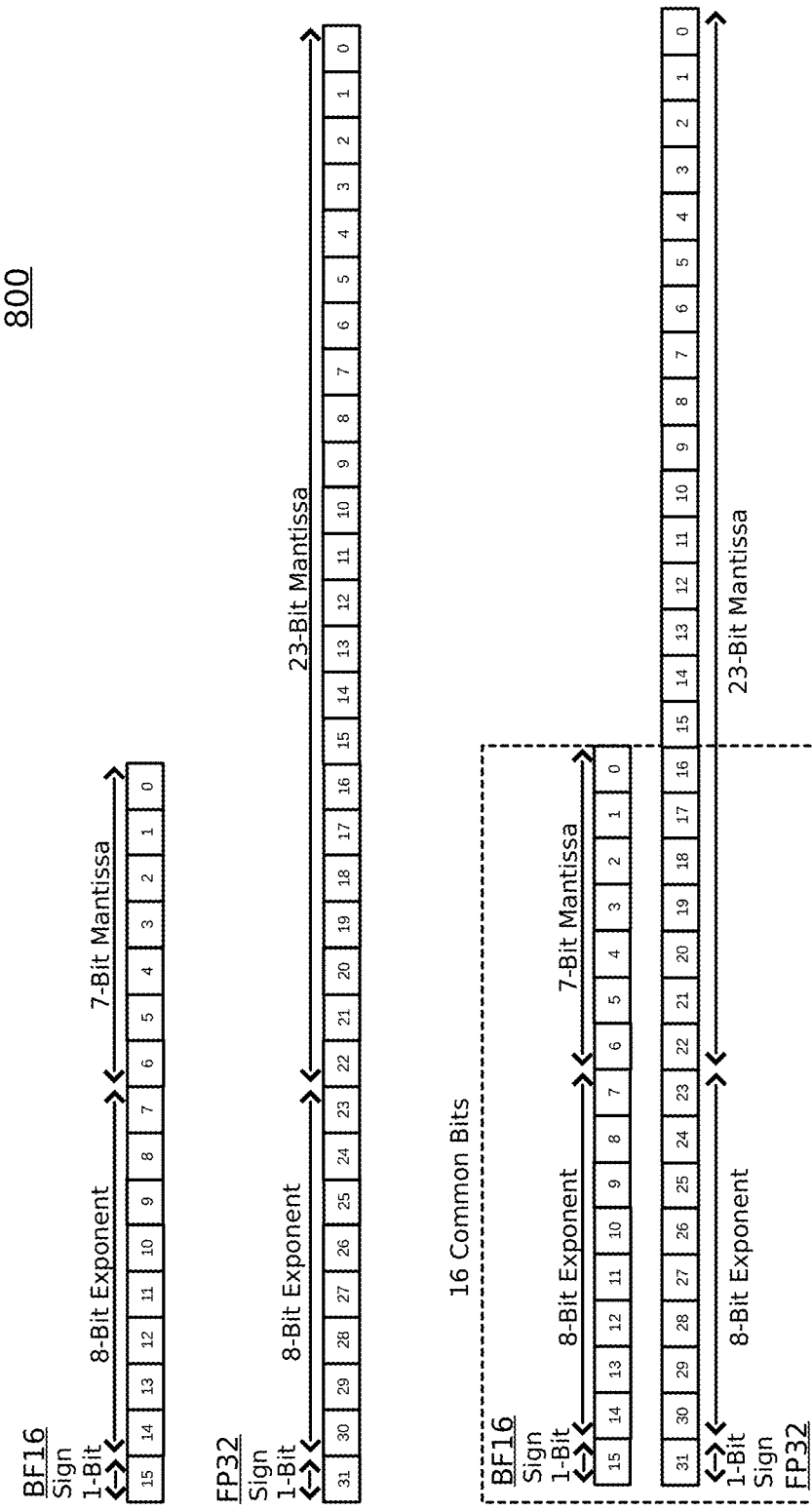
FIG. 8 illustrates a bit-wise comparison of the FP32 data format and the BF16 data format, according to various embodiments.

FIG. 8 is a bit-wise comparison of exemplary low-precision and high-precision representations of input elements, according to various embodiments. In various embodiments, input elements may include elements that are represented in various data formats, such as floating-point formats. For example, FIG. 8 illustrates the 32-bit floating-point (FP32) data format and the 16-bit Bfloat (BF16) data format. For example, and not by way of limitation, an element may be represented in a low-precision data format, such as the BF16 data format. The BF16 data format assigns 16 bits of memory for storing a number. for example, BF16 supports a 7-bit mantissa (for example, bits [6:0]), an 8-bit exponent (for example, bits [14:7]) and a 1-bit sign (for example, bit [15:15]). The computational unit may also support input of high-precision data formats, such as 32-bit floating-point numbers (e.g., FP32). The FP32 data format assigns 32 bits of memory for storing a number. For example, FP32 supports a 23-bit mantissa (for example, bits [23:0]), an 8-bit exponent (for example, bits [30:23]) and a 1-bit sign (for example, bit [31:31]). Accordingly, the FP32 data format use twice as many bits as the BF16 data format in storing a number. Thus, performing computations on elements in the FP32 data format may have a higher computation cost relative to performing computations on elements in the BF16 data format.

In addition, the computational unit may convert data from a first data format to a second data format. For example, and not by way of limitation, the computational unit 100 may convert an element from the FP32 data format to the BF16 data format by truncating bits [0:15] from the FP32 number. Additionally, or alternatively, the computational unit may convert an element from the FP32 data format to the BF16 data format by performing stochastic rounding based on properties of the batch of elements.

Similarly, the computational unit 100 may convert an element from the BF16 data format to the FP32 data format by performing a multiplication operation between the BF16 number and a representation of the identity operator (i.e., 1) in the BF16 data format. The computational unit may further store the product of the multiplication operation in the FP32 data format by storing 32-bits of significant digits of the product.

Figure 9:
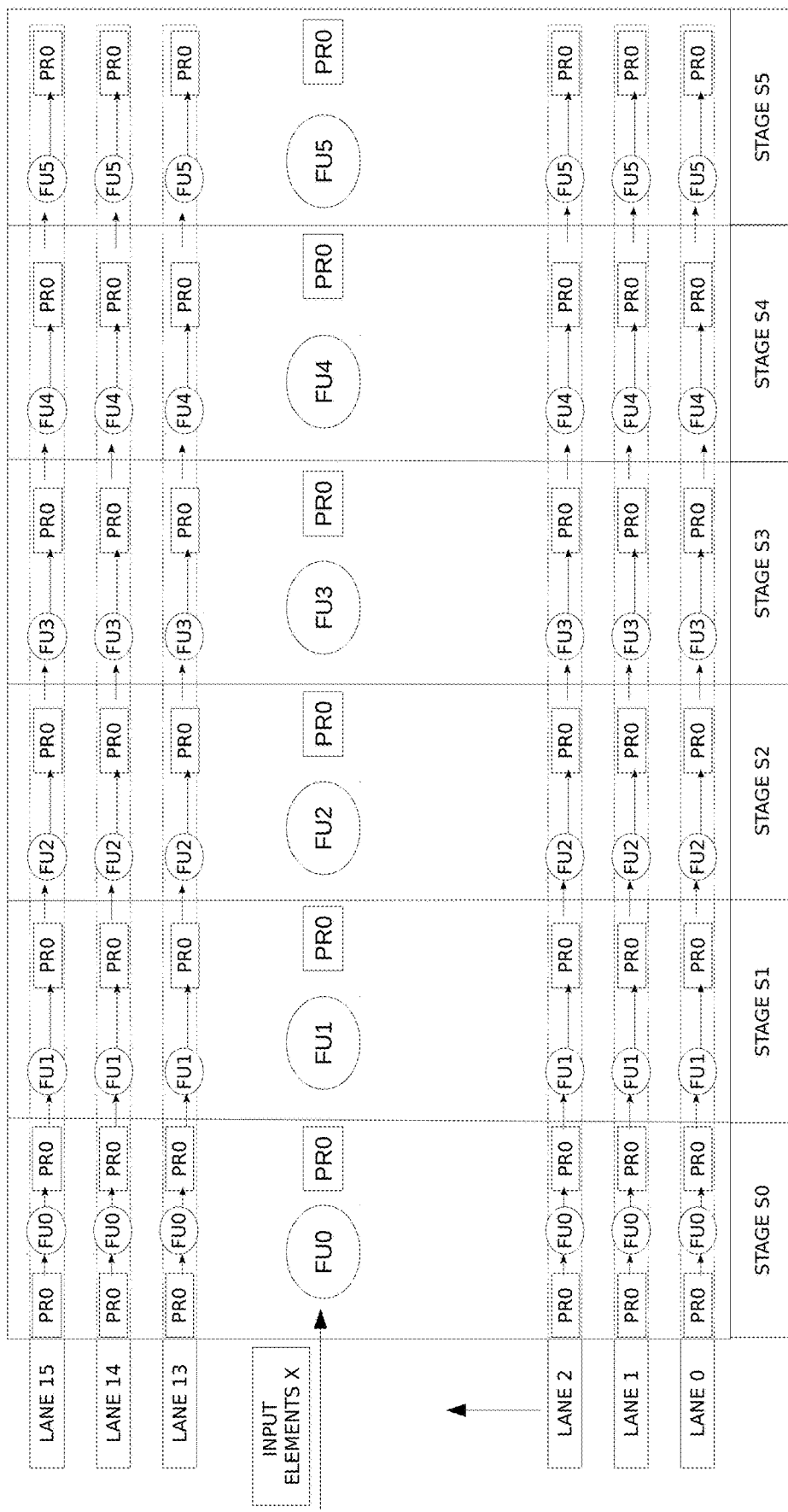
FIG. 9 is an illustration data flow through the PCU of FIG. 3, according to various embodiments.

FIG. 9 illustrates a multi-stage PCU 900, according to various embodiments. In the instance case, the PCU 900 includes 6 stages: S0, S1, S2, S3, S4, and S5. Each state may be associated with a functional unit. For example, S0 may be associated with functional unit FU0; S1 may be associated with functional unit HA; S2 may be associated with functional unit FU2; S3 may be associated with functional unit FU3; S4 may be associated with functional unit FU4; and S5 may be associated with functional unit FU5.

In various embodiments, each stage may operate in series. For example, an input Xi may receive at state S0 by functional unit FU0. Functional unit FU0 may perform one or more floating-point operations to generate a result. The result of FU0 may be an input to functional units in any or all of stages S1, S2, S3, S4, and S5. For example, and not by way of limitation, FU0 may write the result to a pipeline register PR0. HA in stage S1 may perform a read operation on PR0 to obtain the FU0 result. Functional unit HA may utilize the FU0 result as an input for performing floating-point operations. In further embodiments, multiple pipeline registers may be utilized. For example, a PCU 900 may be connected via a bus 160 to a pipeline register 1 (PR1), a pipeline register 2 (PR2), a pipeline register 3 (PR3), etc. Functional units in each stage may perform read operations from one or more of the pipeline registers. Similarly, functional units may perform write operations to one or more of the functional units.

In further embodiments, the PCU 900 may enable computational processes to operate in parallel. For example, each stage may include multiple functional units. Each functional unit within a stage may be assigned to a data lane (e.g., lane 0, lane 1, lane 2, . . . , lane 14, lane 15, etc.). Each functional unit may read data in parallel from one or more pipeline registers. Similarly, each functional unit may write data in parallel to one or more functional units.

Figure 10:
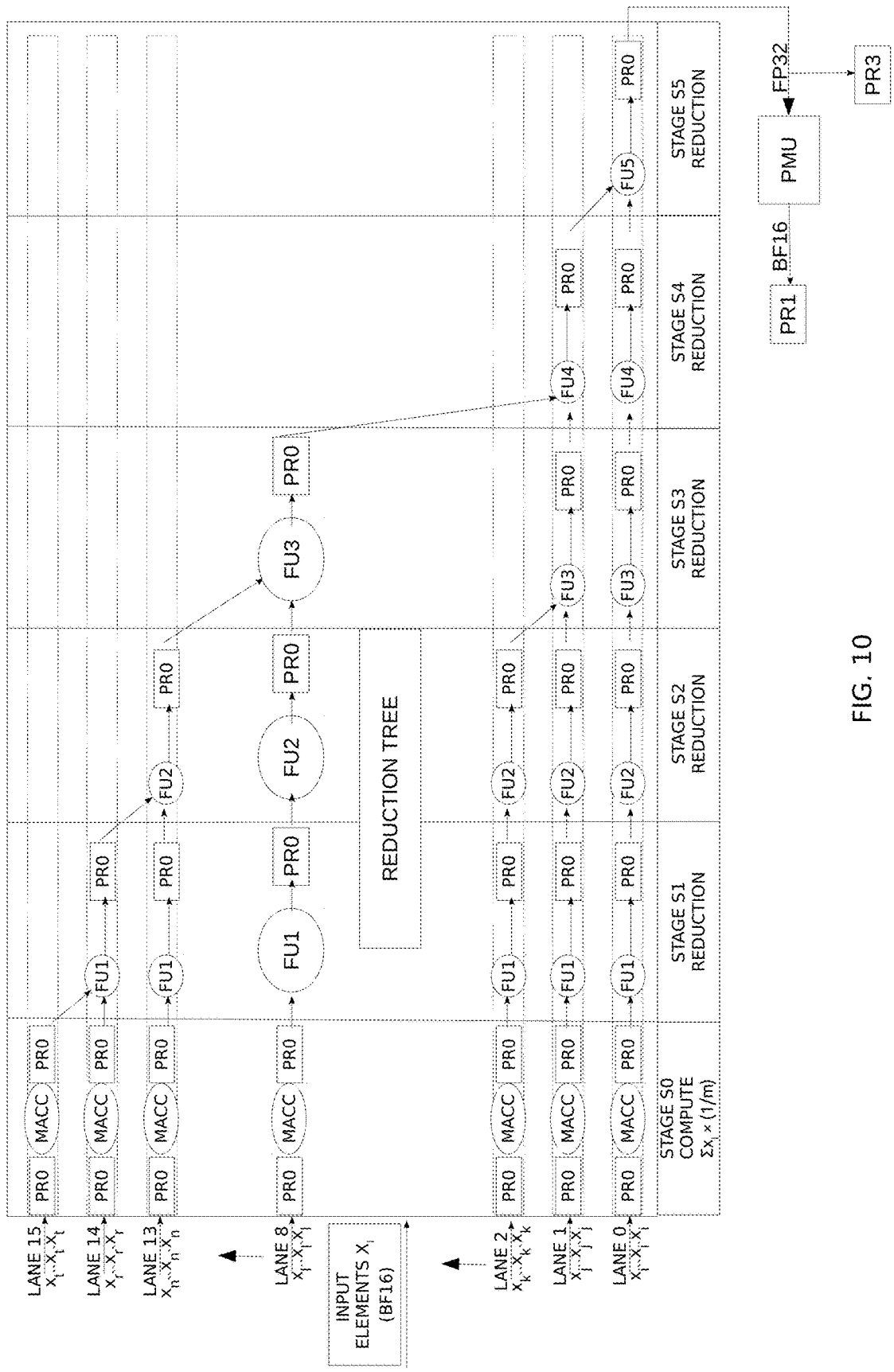
FIG. 10 is an illustration of a computation of a mini-batch mean, according to various embodiments.

FIG. 10 illustrates a PCU 1000 configured to calculate a mini-batch mean, according to various embodiments. The mini-batch mean may be computed according to the following formula:

$$(1/m)\Sigma_{i=1}^{m} x_i,  \quad (1)$$

where $x_i$ is the ith element of the mini-batch and m is the total number of elements in the mini-batch. In various embodiments, the mini-batch mean may be computed with a six-stage PCU 1000: S0, S1, S2, S3, S4, and S5. Each stage may support 16 data lanes: Lane 0 through Lane 15. A pipeline register (e.g., PR0) may store data between stages of the PCU 1000.

In various embodiments, stage S0 may receive input elements $x_i$. Input elements $x_i$ may include numbers in a low-precision representation (e.g., BF16 numbers). In some embodiments, stage S0 may include 16 multiplication-accumulation (MACC) units that process input data in parallel. Each MACC unit may correspond to a lane of the PCU 800. In operation, Each MACC unit may access the pipeline register PR0 to read a portion of the input elements. For example, and not by way of limitation, input elements may be stored in pipeline register 0 in sixteen portions. Each MACC unit may perform a read operation on a different portion of the input elements.

The MACC units may further perform one or more multiplication steps and one or more accumulation steps. For example, and not by way of limitation, each MACC unit may input an element $x_i$ as the multiplicand. Each MACC unit may be configured to set the multiplier to be (1/m), where m is the total number of elements in the mini-batch. For each $x_i$, a MACC unit may compute the product of $x_i$ and 1/m. The accumulator operator in the MACC unit may further sum the product $x_i \times (1/m)$ for each input $x_i$ to generate a result. Each MACC unit may further write the result to the pipeline register 0. Although the above description is written with the example of 16 lanes and 16 MACC units, it is to be understood that any combination of lanes and MACC units are within the scope of the present disclosure.

In various embodiments, stages S1, S2, S3, S4, and S5 may provide a reduction tree. For example, stage S1 may include one or more functional units that perform read operations on data stored in the pipeline register PR0. Each of the functional units may read a portion of the results written by the MACC units to the PR0 in stage S0. Each functional of the units may further perform accumulation operations by summing the obtained results to generate an accumulated result. The functional unit may further write the accumulated result to the pipeline register PR0. Accordingly, the reduction tree compresses stage S0 resultants from two or more lanes to generate a single accumulated result.

In subsequent stages (e.g., S2, S3, S4, and S5), the functional units may continue to perform read operations from the pipeline register PR0, accumulation operations on the read data, and write operations to write the accumulated result to the pipeline register PR0. At the final stage (e.g., stage 5), a final accumulated result is written to the pipeline register PR0. The final accumulated result is the mini-batch mean $\mu$.

In various embodiments, the mini-batch mean $\mu$ may be stored as a high-precision number, e.g., in the FP32 data format. In further embodiments, the computational unit 100 may generate a low-precision mini-batch mean, $\mu_L$, based on the high-precision mini-batch mean $\mu$. For example, and not by way of limitation, a PMU may read the high-precision mini-batch mean from a pipeline register (e.g., PR0). The PMU may further generate a low-precision mini-batch mean by truncating the high-precision mini-batch mean. For example, and not by way of limitation, the PMU may read a high-precision mini-batch mean in a FP32 data format. The PMU may write the first 16 bits of the high-precision mini-batch mean to a pipeline register, thereby generating a low-precision mini-batch mean in the BF16 data format. Thus, the low-precision mini-batch mean utilizes less memory relative to the high-precision mini-batch mean. In addition, generating the low-precision mini-batch mean from the high-precision mini-batch mean, instead of by direct calculation, reduces the effect of accumulated rounding errors.

Figure 11A:
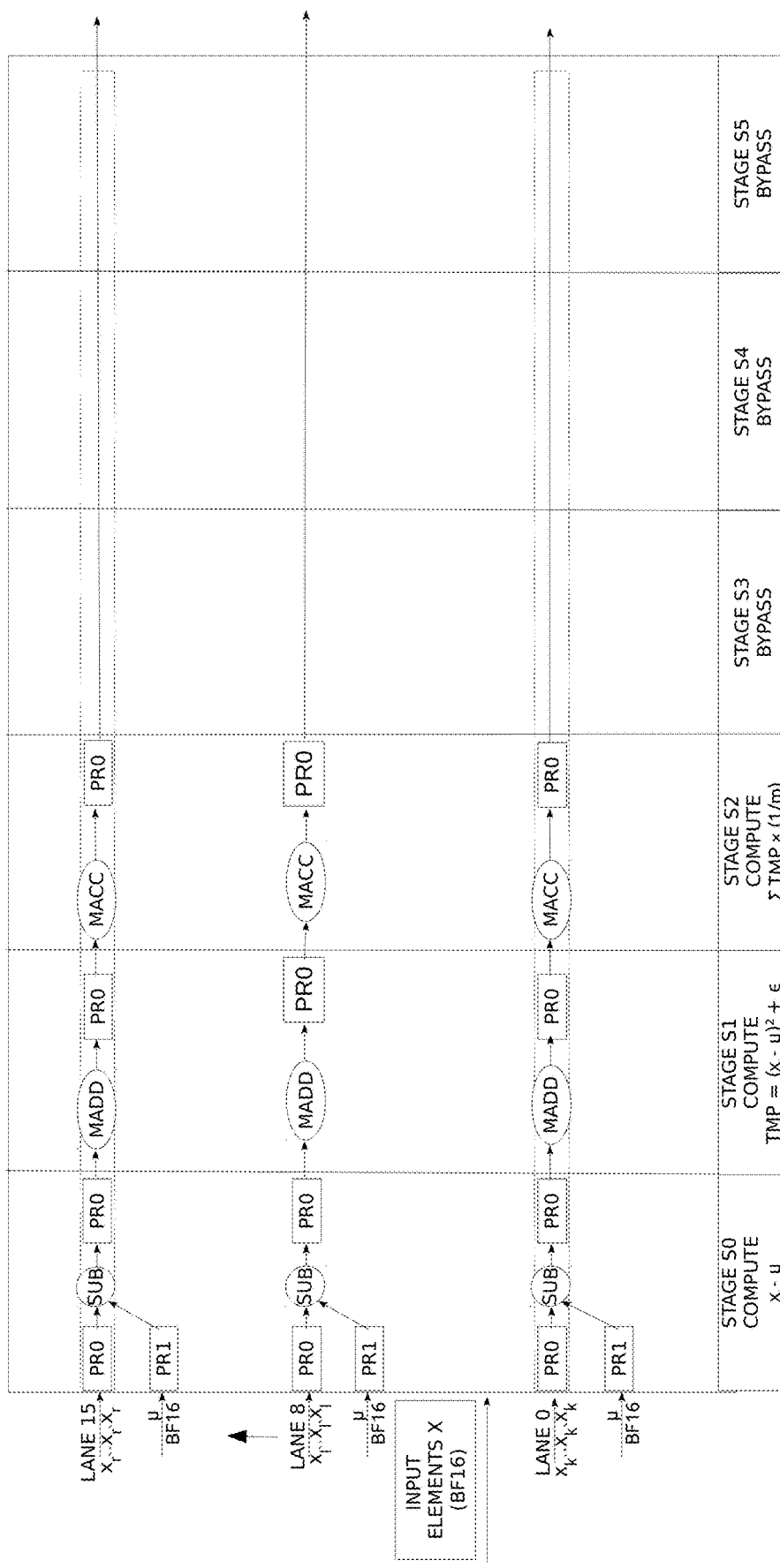
FIGS. 11A-11B is an illustration of a computation of a mini-batch standard deviation, according to various embodiments.
Figure 11B:
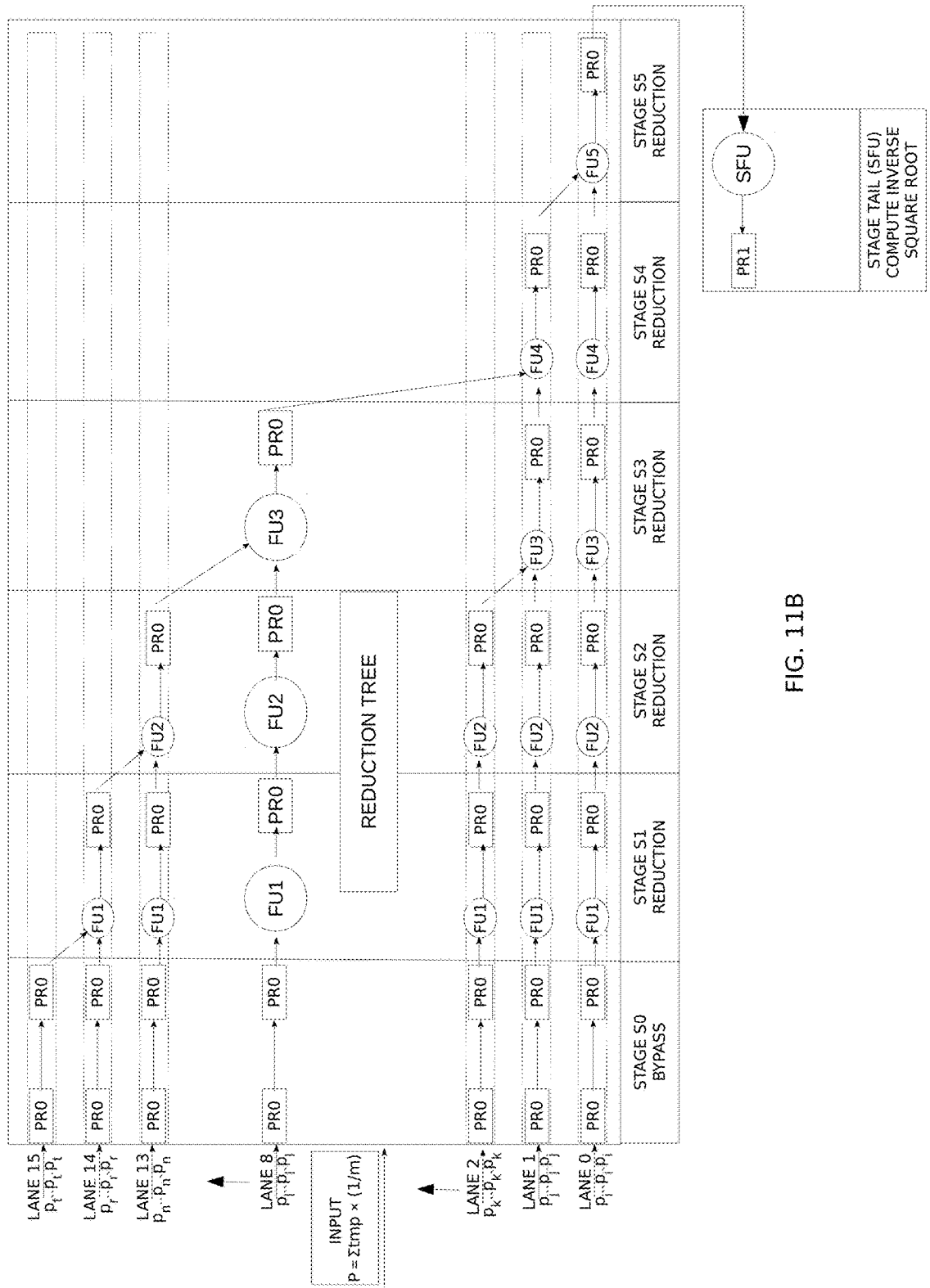

FIGS. 11A-11B illustrates PCUs 1100 and 1110 configured to compute a mini-batch variance, according to various embodiments. The mini-batch variance may be computed according to the following formula:

$$(1/m)\Sigma_{i=1}^{m}(x_i - \mu_L)^2,  \quad (2)$$

where $x_i$ is an ith element of the mini-batch, m is a total number of elements in the mini-batch, and $\mu_L$ is a low-precision mini-batch mean.

In various embodiments, a mini-batch variance may be computed with two six-stage computational units (e.g., PCUs). Each computation unit may include stages: S0, S1, S2, S3, S4, and S5. Each stage of the computational unit may access one or more pipeline registers, e.g., PR0 and PR1. For example, one or more pipeline registers (e.g., PR0 and PR1) may store data between stages of the computation unit.

FIG. 11A illustrates a first step in computing the mini-batch variance, according to various embodiments. For example, stage S0 may include a subtraction unit. The subtraction unit may receive two inputs. For example, the subtraction unit may perform a read operation on the pipeline register PR0 to obtain an ith element of the input vector X, herein denoted $x_i$. Furthermore, the subtraction unit may perform a read operation on the pipeline register PR1 to obtain a stored mini-batch mean. In various embodiments, the subtraction unit may obtain a low-precision mini-batch mean (e.g., a mini-batch mean stored in the BF16 data format). Utilizing a low-precision mini-batch mean may preserve computational throughput. In addition, accumulated rounding errors present in the low-precision mini-batch mean may be cancelled out in the variance computation.

In some embodiments, the subtraction unit may input the $x_i$ as a first input and the mini-batch mean, $\mu$, as the second input to a subtraction operator. Accordingly, the subtraction operator may compute a difference $x_i-\mu$ and write the difference to a pipeline register (e.g., PR0). Although one subtraction unit is illustrated, it is to be understood that any number of subtraction units and any number of pipeline registers may be used in computing differences between mini-batch elements and mini-batch means.

In further embodiments, stage S1 may include a multiplication-addition (MADD) unit. The MADD unit may perform a read operation on a pipeline register (e.g., PR0) to obtain a computed difference, $x_i-\mu$. In various embodiments, the MADD unit may input the difference as both the multiplicand input and the multiplier input to a multiplication operator. Accordingly, the MADD unit may compute the square of $x_i-\mu$. In some embodiments, the MADD unit may further include an error correction during the addition operation step. Specifically, the MADD unit may perform an addition operation by inputting the product $(x_i-\mu)^2$ and a constant term $\epsilon$ into an addition operator. The MADD unit may perform an addition operation using the inputted data and write the sum of the addition operation to a pipeline register (e.g., PR0). The sum will herein be denoted as Tmp. In various embodiments, the constant term may be pre-set in the MADD unit. Additionally, or alternatively, the constant term may be determined based on a stochastic probability measurement of accumulation errors in low-precision floating-point numbers (e.g., error bounds on BF16 numbers).

In additional embodiments, stage S2 may include a multiplication-accumulation (MACC) unit. In various embodiments, the MACC unit may perform a read operation on a pipeline register (PR0) to obtain the Tmp. The MACC unit may input the Tmp as the multiplicand to a multiplication operator. The MACC unit may further utilize a stored value of the inverse number of mini-batch elements (i.e., 1/m) as the multiplier to the multiplication operator. The multiplication operator may generate a product and the MACC unit may pass the product as an input to an accumulate operator. In various embodiments, each MACC unit may read a portion of the Tmp values stored in pipeline register PR0. Accordingly, each MACC unit may perform a multiplication operation and an accumulate operation for each Tmp value read by the MACC unit. The MACC unit may further output the resultant to a pipeline register (e.g., PR0).

In various embodiments, functional units in stages S3, S4, and S5 may be bypassed. For example, and not by way of limitation, these functional units may be configured to remain in an off state. Accordingly, these functional units may not perform read operations from pipeline registers, computational operations, or write operations to pipeline registers.

FIG. 11B illustrates a second step in computing the mini-batch variance, according to various embodiments. For example, a computational unit 1110 may include seven stages: S0, S1, S2, S3, S4, S5, and a Tail stage. As shown, the computational unit 1110 includes 16 lanes: lane0 through lane 15. However, greater or fewer numbers of lanes are within the scope of the present disclosure.

In various embodiments, stage S0 may be bypassed. Accordingly, functional units in stages S0 may be configured to remain in an off state. Thus, these functional units may not perform read operations from pipeline registers, computational operations, or write operations to pipeline registers.

In various embodiments, stages S1, S2, S3, S4, and S5 may provide a reduction tree. For example, in stage S1, one or more functional units may perform read operations on data stored in the pipeline register PR0. Each functional unit may read a portion of the accumulated results in pipeline register PR0. Each functional unit may further perform accumulation operations by adding two or more inputted resultants to produce an accumulated resultant. The functional unit may further write the accumulated resultant to the pipeline register (e.g., PR0). In each stage of the reduction tree, one or more functional units accumulates two or more resultants stored in a pipeline register (e.g., PR0) to form a single accumulated result. The functional unit may further perform a write operation to write the single accumulated result to a pipeline register (e.g., PR0). Accordingly, the reduction tree compresses two or more obtained resultants into a single accumulated resultant.

In subsequent stages (e.g., S2, S3, S4, and S5), the functional units may continue to perform read operations from the pipeline register PR0, accumulation operations on the read data, and write operations to write the accumulated resultant to the pipeline register (e.g., PR0). At the final stage (e.g., stage 5), a final accumulated resultant is written to the pipeline register (e.g., PR0). The final accumulated resultant is denoted as the mini-batch variance, $\sigma^2$.

In various embodiments, a further stage of the computational unit 1110 may include a Tail stage. The Tail stage may include one or more special functional units (e.g., an inverse square root unit). The special functional unit may perform a read operation on data stored in the pipeline register (e.g., a the mini-batch variance stored in pipeline register PR0). The special functional unit may additionally perform one or more computational operations on the inputted data to generate an operational result. In addition to performing one or more operations, the special functional unit may further perform a write operation to write the operational result to a pipeline register. For example, an inverse square root unit may perform a read operation to obtain the mini-batch variance from a pipeline register (e.g., PR0). The inverse square root unit may further perform an inverse square root operation to compute the mini-batch inverse standard deviation $1/\sqrt{(\sigma^2+\epsilon)}$. For example, and not by way of limitation, the inverse square root unit 600 may include an inverse square root operator that utilizes an iterative root-finding algorithm to compute the inverse square root of the mini-batch variance (e.g., by utilizing Newton's method). For example, and not by way of limitation, the inverse square root unit may perform a write operation to write the mini-batch inverse standard deviation to the pipeline register PR0.

Figure 12:
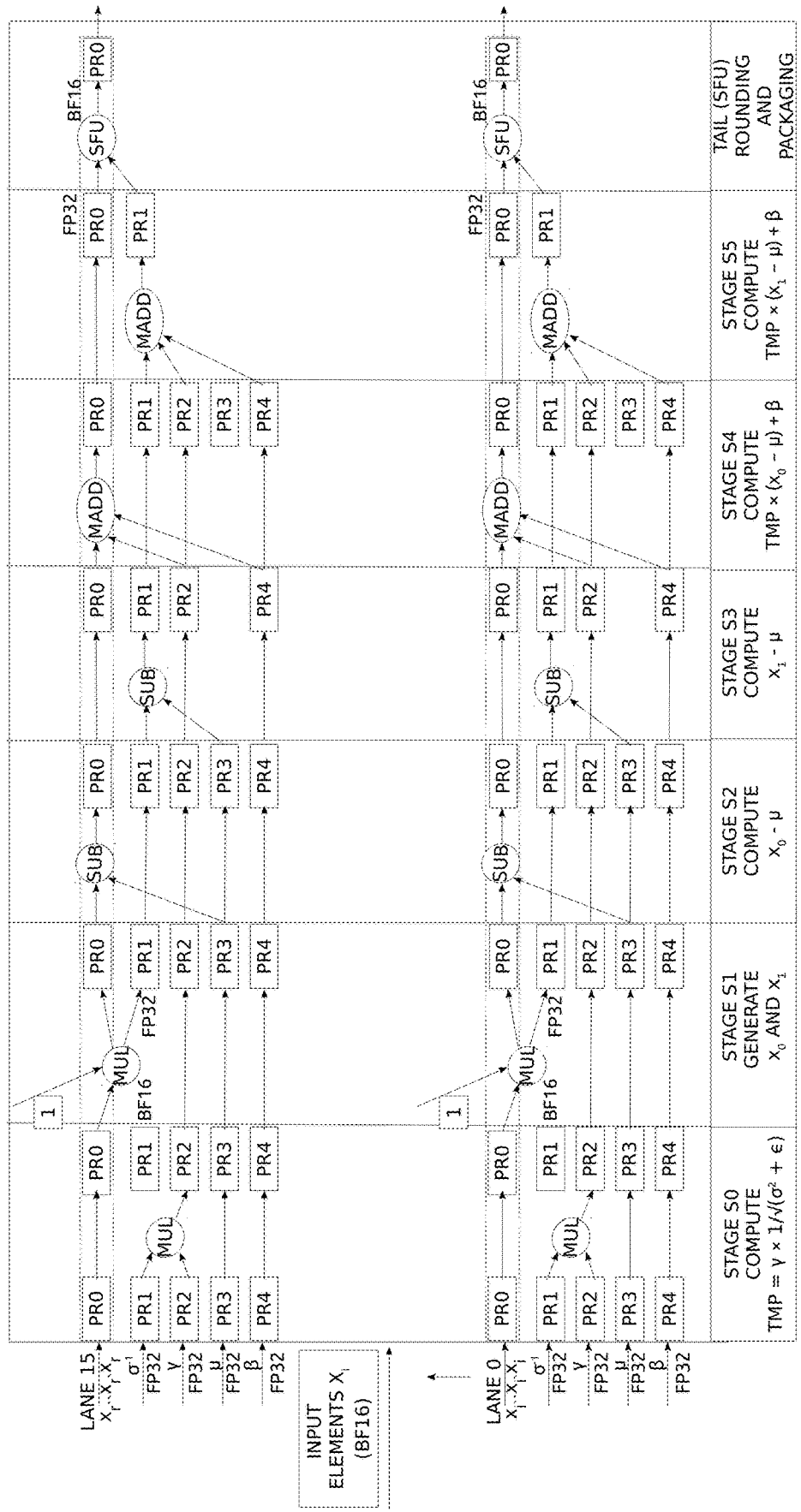
FIG. 12 is an illustration of a computation of a normalization using the mini-batch mean of FIG. 10 and the mini-batch standard deviation of FIGS. 11A-11B, according to various embodiments.

FIG. 12 illustrates a computational unit configured to compute a normalized value for a mini-batch element, according to various embodiments. The normalization may be computed according to the following formulas:

$$x_i\hat{} = (x_i - \mu_H)/\sqrt{(\sigma^2+\epsilon)}, \quad (3)$$

where $x_i$ is an element of the mini-batch, $x_i\hat{}$ is a normalized element of the mini-batch, $\mu$ is a mini-batch average, $\sigma^2$ is the mini-batch variance, and $\epsilon$ is a constant term.

$$y_i = \gamma \times x_i\hat{} + \beta, \quad (4)$$

where $x_i\hat{}$ is a normalized element of the mini-batch, $y_i$ is a scaled and shifted normalized element, $\gamma$ is a scale factor, and $\beta$ is a shifting factor.

In various embodiments, the normalized mini-batch element, $x_i\hat{}$, and the scaled and shifted mini-batch element, $y_i$, may be computed by a seven-stage computational unit 1000 (e.g., a PCU). The computation unit 1200 may include stages: S0, S1, S2, S3, S4, S5 and a Tail stage. Each stage of the computational unit may access, via a bus, one or more pipeline registers, e.g., PR0, PR1, PR2, PR3, and PR4. In various embodiments, pipeline registers (e.g., PR0 through PR4) may store data between stages of the computation unit 1200.

In some embodiments, a pipeline register PR0 may store an ith mini-batch element $x_i$. The pipeline register PR1 may store an inverse standard deviation, $1/\sqrt{(\sigma^2+\epsilon)}$. The pipeline register PR2 may store the scale factor, $\gamma$. The pipeline register PR3 may store the high-precision mini-batch mean, $\mu$. Further, the pipeline register PR4 may store the shift factor $\beta$. In some embodiments, the mini-batch element $x_i$ may be a low-precision number (e.g., BF16). The inverse standard deviation may be a low-precision number (e.g., BF16). The scale factor, $\gamma$, may be high-precision number (e.g., FP32). The mini-batch mean, $\mu$, may be high-precision number (e.g., FP32). Further, the shift factor, $\beta$, may be high-precision number (e.g., FP32).

In some embodiments, stage S0 may include one or more multiplication units. The multiplication unit may perform a read operation on pipeline register PR1 to obtain the inverse standard deviation, $1/\sqrt{(\sigma^2+\epsilon)}$. The multiplication unit may further read the pipeline register PR2 to obtain the scale factor, $\gamma$. The multiplication units may input the inverse standard deviation as the multiplicand and the scale factor as the multiplier to a multiplication operator. The multiplication operator may compute the product, $\gamma \times 1/\sqrt{(\sigma^2+\epsilon)}$. The multiplication unit may further write the product to the pipeline register PR2.

In additional embodiments, stage S1 may also include one or more multiplication units. A multiplication unit may perform a read operation on pipeline register PR0 to obtain the ith mini-batch element $x_i$. The multiplication unit may further input the mini-batch element $x_i$ as the multiplicand to a multiplication operator. In addition, the multiplication unit may be configured to set the multiplier to be of unit value (e.g., 1). In various embodiments, value 1 may be a low-precision number (e.g., a BF16 unit value). The multiplication operator may compute a product, $x_i \times 1$. As is well-known in the art, the product of two low-precision numbers may be written as a high-precision number. In the instance case, the product of a BF16 number (i.e., $x_i$) and a second BF16 number (i.e., 1) may be stored as an FP32 number (i.e., $x_i \times 1$). In addition, the multiplication operator may output two products, herein designated as $x_0$ and $x_1$. The multiplication unit may perform a write operation to write each product to a pipeline register. For example, the multiplication unit may write the $x_0$ result in pipeline register PR0 and further write the $x_i$ result in pipeline register PR1.

In further embodiments, stage S2 may include one or more subtraction units. The subtraction unit may perform a read operation on one or more pipeline registers to obtain two inputs. For example, and not by way of limitation, the subtraction unit may perform a read operation on pipeline register PR0 to obtain the mini-batch element $x_0$. Additionally, the subtraction unit may perform a read operation on a pipeline register PR3 to obtain the high-precision mini-batch mean, $\mu_H$. The subtraction unit may configure a subtraction operator to perform a subtraction operation to compute the difference between the mini-batch element and the high-precision mean (i.e., $x_0-\mu_H$). The subtraction unit may store the difference, $x_0-\mu_H$, in a pipeline register (e.g., pipeline register PR0).

In addition, the stage S3 may also include one or more subtraction units. A subtraction unit may perform a read operation on one or more pipeline registers to receive two inputs. For example, and not by way of limitation, the subtraction unit may perform a read operation on pipeline register PR1 to obtain the mini-batch element $x_1$. Additionally, the subtraction unit may perform a read operation on a pipeline register PR3 to obtain the high-precision mini-batch mean, $\mu_H$. The subtraction unit may configure the subtraction operator to compute the difference between the mini-batch element and the high-precision mean (i.e., $x_1-\mu_H$). The subtraction unit may store the the difference, $x_1-\mu_H$, in a pipeline register (e.g., pipeline register PR1). Although one subtraction unit is illustrated, it is to be understood that any number of subtraction units and any number of pipeline registers computing differences between mini-batch elements and mini-batch means is envisioned by the present disclosure.

Furthermore, stage S4 may include on or more multiplication-addition (MADD) units. A MADD unit may perform a read operation on a pipeline register (e.g., PR0) to obtain an input multiplicand (i.e., $x_0-\mu_H$). In addition, the MADD unit may perform a read operation on a second pipeline register (e.g., PR2) to obtain an input multiplier (i.e., $\gamma \times 1/\sqrt{(\sigma^2+\epsilon)}$). The MADD unit may further perform configure a multiplication operator to compute a product $(x_0-\mu_H) \times (\gamma \times 1/\sqrt{(\sigma^2+\epsilon)})$.

The MADD unit may further input the product to an addition operator. Also, the MADD unit may perform a read operation on a pipeline register (e.g., PR4) to obtain a second additive element (i.e., the shift factor, $\beta$). The MADD unit may further compute the result $[(x_0-\mu_H) \times (\gamma \times 1/\sqrt{(\sigma^2+\epsilon)})]+\beta$, which is herein referred to as $y_0$, the scaled and shifted value of the normalized mini-batch element $x_0$. The MADD unit may write the resultant, $y_0$, to a pipeline register (e.g., pipeline register PR0).

Similarly, stage S5 may include one or more multiplication-addition (MADD) units. A MADD unit may perform a read operation on a pipeline register (e.g., PR1) to obtain a input multiplicand (i.e., $x_i-\mu_H$). In addition, the MADD unit may perform a read operation on a second pipeline register (e.g., PR2) to obtain an input multiplier (i.e., $\gamma \times 1/\sqrt{(\sigma^2+\epsilon)}$). The MADD unit may further configure a multiplication operator to compute a product $(x_1-\mu_H) \times (\gamma \times 1/\sqrt{(\sigma^2+\epsilon)})$.

The MADD unit may utilize the computed product as an input an addition operator. Also, the MADD unit may perform a read operation on a pipeline register (e.g., PR4) to obtain a second additive element (i.e., the shift factor, $\beta$). The MADD unit may further compute the result $(x_0-\mu_H) \times (\gamma \times 1/\sqrt{(\sigma^2+\epsilon)})+\beta$, which is herein referred to as $y_i$, the scaled and shifted value of the normalized mini-batch element $x_1$. The MADD unit may further write the resultant, $y_1$, to a pipeline register, (e.g., pipeline register PR1).

In various embodiments, a further stage of the computational unit may include a tail stage. The tail stage may include one or more special functional units (e.g., a stochastic rounding unit, a packing unit, etc.). The special functional unit may perform a read operation on data stored in a pipeline register (e.g., the result, $y_0$, and the result, $y_1$). The special functional unit may perform one or more computational operations on the inputted data to generate an operational result. In addition to performing one or more operations, the special functional unit may further perform a write operation to write the operational result to a pipeline register. For example, the stochastic rounding unit may convert the results $y_0$ and $y_1$ into low-precision floating-point numbers. For example, the results may be FP32 numbers. Accordingly, the stochastic rounding unit may convert the FP32 results $y_0$ and $y_1$ into low-precision BF16 numbers $w_0$ and $w_1$. In addition, the packaging unit may store the low-precision BF16 numbers as a single data structure (e.g., a vector). The packaging unit may perform a write operation to write the generated data structure to a pipeline register.

In sum, in various embodiments, a computation unit may include a first circuit to traverse a batch of input elements $x_i$ having a first format, to produce a mean $\mu_1$ in the first format and a mean $\mu_2$ in a second format, the second format having more bits than the first format. The computation unit may further include a second circuit operatively coupled to the first circuit to traverse the batch of input elements $x_i$ to produce a standard deviation $\sigma$ for the batch using the mean $\mu_1$ in the first format. The computation unit may also include a third circuit operatively coupled to the second circuit to traverse the batch of input elements $x_i$ to produce a normalized set of values $y_i$ using the mean $\mu_2$ in the second format and the standard deviation $\sigma$.

In the computation unit, the third circuit may also compute differences $x_i-\mu_2$, and may further multiply the differences by a factor which is a function of the variance $\sigma$ in the first format. In the computation unit, the factor may be an inverse of $(\sigma+\epsilon)$, where $\epsilon$ is a constant.

In the computation unit, the third circuit may convert input elements $x_i$ from the first format to the second format by computing the product of each input element $x_i$ in the first format and the identity operator in the first format. In the computation unit, the third circuit may produce two normalized elements $y_0$ and $y_1$ for each input element $x_i$. Furthermore, the third circuit may compress the two normalized elements to produce a single output. In addition the third circuit may produce a scaled and shifted normalized set of elements in the second format. Also, the third circuit may perform stochastic rounding to convert the normalized set of elements to the first format.

In various embodiments, in the computation unit, the second circuit may traverse the batch of input elements $x_i$ to compute, for each $x_i$: a difference $x_i-\mu_1$; a square of the difference, $(x_i-\mu_1)^2$; and a sum of the square of the difference and a constant term $\epsilon$, $(x_i-\mu_1)^2+\epsilon$. In the computation unit, the second circuit may further traverse the batch of input elements $x_i$ to compute: an accumulated sum of the sums, $(x_i-\mu_1)^2+\epsilon$; and an inverse square root of the accumulated sum.

In some embodiments, in the computation unit, the first circuit may modify the mean $\mu_2$ in the second format to produce the mean $\mu_1$ in the first format. The first circuit may modify the mean $\mu_2$ by truncating at least one bit from the mean $\mu_2$ in the second format.

In various embodiments, a re-configurable processor may include a first circuit to traverse a batch of input elements $x_i$ having a first format, to produce a mean $\mu_1$ in the first format and a mean $\mu_2$ in a second format, the second format having more bits than the first format. The re-configurable processor may further include a second circuit operatively coupled to the first circuit to traverse the batch of input elements $x_i$ to produce a standard deviation $\sigma$ for the batch using the mean $\mu_1$ in the first format. The re-configurable processor may also include a third circuit operatively coupled to the second circuit to traverse the batch of input elements $x_i$ to produce a normalized set of values $y_i$ using the mean $\mu_2$ in the second format and the standard deviation $\sigma$.

In the re-configurable processor, the third circuit may also compute differences $x_i-\mu_2$, and may further multiply the differences by a factor which is a function of the variance $\sigma$ in the first format. In the re-configurable processor, the factor may be an inverse of $(\sigma+\epsilon)$, where $\epsilon$ is a constant.

In the re-configurable processor, the third circuit may convert input elements $x_i$ from the first format to the second format by computing the product of each input element $x_i$ in the first format and the identity operator in the first format. In the re-configurable processor, the third circuit may produce two normalized elements $y_0$ and $y_1$ for each input element $x_i$. Furthermore, the third circuit may compress the two normalized elements to produce a single output. In addition, the third circuit may produce a scaled and shifted normalized set of elements in the second format. Also, the third circuit may perform stochastic rounding to convert the normalized set of elements to the first format.

In various embodiments, in the re-configurable processor, the second circuit may traverse the batch of input elements $x_i$ to compute, for each $x_i$: a difference $x_i-\mu_1$; a square of the difference, $(x_i-\mu_1)^2$; and a sum of the square of the difference and a constant term $\epsilon$, $(x_i-\mu_1)^2+\epsilon$. In the re-configurable processor, the second circuit may further traverse the batch of input elements $x_i$ to compute: an accumulated sum of the sums, $(x_i-\mu_2)^2+\epsilon$; and an inverse square root of the accumulated sum.

In some embodiments, in the re-configurable processor, the first circuit may modify the mean $\mu_2$ in the second format to produce the mean $\mu_1$ in the first format. The first circuit may modify the mean $\mu_2$ by truncating at least one bit from the mean $\mu_2$ in the second format.

In various embodiments, a method may include traversing, by a first circuit, a batch of input elements $x_i$ having a first format, to produce a mean $\mu_1$ in the first format and a mean $\mu_2$ in a second format, the second format having more bits than the first format. The method may further include traversing, by a second circuit, the batch of input elements $x_i$ to produce a standard deviation $\sigma$ for the batch using the mean $\mu_1$ in the first format. The method may also include traversing, by a third circuit, the batch of input elements $x_i$ to produce a normalized set of values $y_i$ using the mean $\mu_2$ in the second format and the standard deviation $\sigma$.

In the method, the third circuit may also compute differences $x_2-\mu_2$, and may further multiply the differences by a factor which is a function of the variance $\sigma$ in the first format. In the method, the factor may be an inverse of $(\sigma+\epsilon)$, where $\epsilon$ is a constant.

In the method, the third circuit may convert input elements $x_i$ from the first format to the second format by computing the product of each input element $x_i$ in the first format and the identity operator in the first format. In the method, the third circuit may produce two normalized elements $y_0$ and $y_1$ for each input element $x_i$. Furthermore, the third circuit may compress the two normalized elements to produce a single output. In addition, the third circuit may produce a scaled and shifted normalized set of elements in the second format. Also, the third circuit may perform stochastic rounding to convert the normalized set of elements to the first format.

In various embodiments, in the method, the second circuit may traverse the batch of input elements $x_i$ to compute, for each $x_i$: a difference $x_i-\mu_1$; a square of the difference, $(x_i-\mu_1)^2$; and a sum of the square of the difference and a constant term $\epsilon$, $(x_i-\mu_1)^2+\epsilon$. In the method, the second circuit may further traverse the batch of input elements $x_i$ to compute: an accumulated sum of the sums, $(x_i-\mu_1)^2+\epsilon$; and an inverse square root of the accumulated sum.

In some embodiments, in the method, the first circuit may modify the mean $\mu_2$ in the second format to produce the mean $\mu_1$ in the first format. The first circuit may modify the mean $\mu_2$ by truncating at least one bit from the mean $\mu_2$ in the second format.

Although examples are described herein based on the use of single precision floating point FP32 format floating point numbers, the technique is applicable to other data encoding formats, including, for example, double-precision floating-point FP64 format numbers, binary format numbers, and other encoding formats.

While the present disclosure is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A reconfigurable data processor comprising:
    a first circuit comprising a set of one or more computation units configured to respectively receive separate subsets of a batch of input elements $x_i$ having a first format at individual lanes of the first set of computation units and produce a mean $\mu_1$ in the first format and a mean $\mu_2$ in a second format, the second format having more bits than the first format;
    a second circuit operatively coupled to the first circuit to traverse the batch of input elements $x_i$ to produce a standard deviation $\sigma$ for the batch using the mean $\mu_1$ in the first format; and
    a third circuit operatively coupled to the second circuit to traverse the batch of input elements $x_i$ to produce a normalized set of values $y_i$ using the mean $\mu_2$ in the second format and the standard deviation $\sigma$;
    wherein at least one of the computation units of the first set of computation units comprises a multi-lane, multi-stage computation pipeline.

2. The reconfigurable data processor of claim 1, wherein the third circuit computes differences $x_i-\mu_2$, and multiplies the differences by a factor which is a function of a variance $\sigma^2$ in the first format.

3. The reconfigurable data processor of claim 2, wherein the factor is an inverse of $(\sigma^2+\epsilon)$, where $\epsilon$ is a machine constant that is used to avoid division by zero.

4. The reconfigurable data processor of claim 1, wherein the third circuit computes input elements $x_i$ from the first format to the second format by computing the product of each input element $x_i$ in the first format and the identity operator in the first format.

5. The reconfigurable data processor of claim 1, wherein the third circuit produces two normalized elements $y_0$ and $y_1$ for each input element $x_i$.

6. The reconfigurable data processor of claim 5, wherein the third circuit compresses the two normalized elements to produce a single output.

7. The reconfigurable data processor of claim 1, wherein the third circuit produces a scaled and shifted normalized set of elements in the second format.

8. The reconfigurable data processor of claim 1, wherein the third circuit performs stochastic rounding to convert the normalized set of elements to the first format.

9. The reconfigurable data processor of claim 1, wherein the second circuit traverses the batch of input elements $x_i$ to compute for each $x_i$:
    a difference $x_i-\mu_1$;
    a square of the difference, $(x_i-\mu_1)^2$; and
    a sum of the square of the difference and a constant term $\epsilon$, $(x_i-\mu_1)^2+\epsilon$.

10. The reconfigurable data processor of claim 9, wherein the second circuit further traverses the batch of input elements $x_i$ to compute:
    an accumulated sum of the sums, $(x_i-\mu_1)^2+\epsilon$; and
    an inverse square root of the accumulated sum.

11. The reconfigurable data processor of claim 1, wherein the first circuit modifies the mean $\mu_2$ in the second format to produce the mean $\mu_1$ in the first format.

12. The reconfigurable data processor of claim 11, wherein the first circuit modifies the mean $\mu_2$ by truncating at least one bit from the mean $\mu_2$ in the second format.

13. The reconfigurable data processor of claim 1, further comprising an array of computation units that includes the first set of computation units, a second set of one or more computation units comprising the second circuit, and a third set one or more computation units comprising the third circuit.

14. The reconfigurable data processor of claim 1, the first set of computation units comprising:
    a subset of computation units configured to produce the mean $\mu_2$ in the second format, the subset of computation units including the at least one of the computation units that comprises the multi-lane, multi-stage computation pipeline; and
    another computation unit configured to produce a mean $\mu_1$ in the first format by modifying the mean $\mu_2$ in the second format.

15. The reconfigurable data processor of claim 1, wherein:
    the individual lanes of the first set of computation units that receive the separate subsets of the batch of input elements $x_i$ have a first stage of their multi-stage computation pipeline configured to perform $\Sigma x_i/m$, where m is the number of input elements $x_i$ in the batch; and
    at least some later stages of the multi-stage computation pipelines of the first set of computation units are configured as a reduction tree to generate a single accumulated result for the mean $\mu_2$ in the second format.

16. A method, comprising:
    traversing, by a first circuit comprising a set of one or more computation units, a batch of input elements $x_i$ having a first format, to produce a mean $\mu_1$ in the first format and a mean $\mu_2$ in a second format, the second format having more bits than the first format, wherein at least one computation unit of the first set of computation units comprises a multi-lane, multi-stage computation pipeline that respectively receives a separate subset of the batch of input elements $x_i$ at individual lanes;
    traversing, by a second circuit, the batch of input elements $x_i$ to produce a standard deviation $\sigma$ for the batch using the mean $\mu_1$ in the first format; and
    traversing, by a third circuit, the batch of input elements $x_i$ to produce a normalized set of elements $y_i$ using the mean $\mu_2$ in the second format and the standard deviation $\sigma$.

17. The method of claim 16, wherein producing a normalized set of elements $y_i$ further comprises:
    computing differences $x_i-\mu_2$; and
    multiplying the differences by a factor which is a function of a variance $\sigma^2$ in the first format.

18. The method of claim 17, wherein the factor is an inverse of $(\sigma^2+\epsilon)$, where $\epsilon$ is a constant.

19. The method of claim 16, further comprising converting input elements $x_i$ from the first format to the second format by computing the product of each input element $x_i$ in the first format and the identity operator in the first format.

20. The method of claim 16, further comprising producing a scaled and shifted normalized set of elements in the second format.

21. The method of claim 16, wherein the first circuit, the second circuit, and the third circuit each comprise one or more computation units in an array of computation units of a reconfigurable data processor.

22. The method of claim 16, further comprising:
calculating, at a first stage of the multi-stage computation pipeline of the individual lanes of the first set of computation units that receive the separate subsets of the batch of input elements $x_i$, $\Sigma x_i/m$, where m is the number of input elements $x_i$ in the batch; and
generating a single accumulated result for the mean $\mu_2$ in the second format using at least some later stages of the multi-stage computation pipelines of the first set of computation units configured as a reduction tree.

23. The method of claim 22, further comprising:
producing the mean $\mu_2$ in the second format in a subset of the first set of computation units that includes the at least one of the computation units that comprises the multi-lane, multi-stage computation pipeline; and
producing the mean $\mu_1$ in the first format by modifying the mean $\mu_2$ in the second format in another computation unit of the first set of computation unit outside of the subset.

* * * * *